United States Patent [19]

Sanner

[11] 4,061,893

[45] Dec. 6, 1977

[54] SPRINKLER FLOW CONTROL SYSTEMS HAVING CONTINUOUS CYCLE TIMER AND ASSOCIATED APPARATUS DISPOSED IN A HERMETICALLY SEALED HOUSING

[76] Inventor: George E. Sanner, P.O. Box 10707, Towson, Md. 21204

[21] Appl. No.: 676,877

[22] Filed: Apr. 14, 1976

Related U.S. Application Data

[60] Division of Ser. No. 625,350, Oct. 25, 1975, Pat. No. 4,014,359, which is a continuation-in-part of Ser. No. 466,693, May 3, 1974, Pat. No. 3,915,185, which is a continuation-in-part of Ser. No. 272,793, June 18, 1972, Pat. No. 3,848,616, which is a continuation-in-part of Ser. No. 18,829, Feb. 12, 1970, abandoned, which is a division of Ser. No. 456,787, May 18, 1965, Pat. No. 3,500,844.

[51] Int. Cl.² ..................... H01H 7/00; H01H 43/00
[52] U.S. Cl. ............................... 200/38 D; 307/141.4
[58] Field of Search ............ 174/52 R, 65; 200/38 D, 200/38 DC, 302, 303, 61.05, 38 R; 307/141, 141.4, 141.8, 118; 239/67, 69, 70, 63, 64; 137/78

[56] References Cited

U.S. PATENT DOCUMENTS

| 2,986,167 | 5/1961 | Griswold et al. | 200/38 DA X |
|---|---|---|---|
| 3,500,844 | 3/1970 | Sanner | 200/61.05 X |
| 3,573,343 | 4/1971 | De Smidt et al. | 200/303 X |
| 3,848,616 | 11/1974 | Sanner | 200/61.05 X |
| 3,864,539 | 2/1975 | Hauser | 200/38 DB X |
| 4,014,359 | 3/1977 | Sanner | 200/302 X |

Primary Examiner—James R. Scott

[57] ABSTRACT

A simple electrical timer switch control for consumer users is described. It provides automatic time control of outdoor appliances such as lawn sprinklers. A simple, novel, and unique hermetically sealed outdoor casing provides protection from electrical shock hazzard while maintaining the portable characteristics of the control. Means are provided for selecting any one, or more, time interval(s) in any given 24 hour time period; and, for automatically overriding the selected time interval(s) within any 24 hour period, or combination of 24 hour periods, within any given 14 day period.

63 Claims, 17 Drawing Figures

SPRINKLER FLOW CONTROL SYSTEMS HAVING CONTINUOUS CYCLE TIMER AND ASSOCIATED APPARATUS DISPOSED IN A HERMETICALLY SEALED HOUSING

This application is a division of application Ser. No. 625,350, filed Oct. 25, 1975, now U.S. Pat. No. 4,014,359, which is a continuation in part of application Ser. No. 466,693 filed May 3, 1974, now U.S. Pat. No. 3,915,185, which was a continuation-in-part of application Ser. No. 272,793 filed June 18, 1972 (now U.S. Pat. No. 3,848,616). The latter is a continuation-in-part of application Ser. No. 18,829 filed Feb. 12, 1970 (now abandoned) which is a division of application Ser. No. 456,787 filed May 18, 1965 (now U.S. Pat. No. 3,500,844).

The present invention relates electrical timer switch controls such as sprinkler flow control systems; and more specifically, primarily to novel, improved, self contained electrical timer type fluid flow control units for lawn sprinkling and other outdoor lawn and garden applications.

This invention relates to control systems and, primarily, to systems for automatically controlling the operation of outdoor electrical appliances such as lawn sprinklers; although, the invention disclosed herein may be used for other purposes as well.

Numerous automatically controlled lawn sprinkler systems have heretofore been proposed. A major disadvantage of many of these is that no provision is made for turning off the sprinklers during periods of natural rainfall. Consequently, such systems waste water and, in addition, may overwater and damage the grass of lawns where such systems are employed.

This problem has heretofore been recognized, and several attempts have been made to solve it as is shown by U.S. Pat. Nos. 2,284,158, 2,318,969, 3,063,643, and 3,140,720. These disclose automatic controlled lawn sprinkling systems in which provision is made for shutting off the sprinklers when it begins to rain. However, the systems of this type, heretofore known, have a number of disadvantages. First, they often employ a mechanical arrangements; such as, a float-operated switch for shutting off the sprinklers, which is complex, expensive, bulky, less reliable, and more difficult to adjust than is desirable. Second, these prior systems have an undesirably long reaction time. Third, some of the prior art systems must be manually reset after the rain ceases by draining a rain collecting container. In the others, resetting of the system involves the evaporation of collected moisture from a container, which takes an undesirably long period of time.

Other types of control units for lawn sprinkling and comparable fluid flow systems also include a mechanical timer and a valve housed in an appropriate casing provided with connections for fluid inflow and outflow conduits. Exemplary control units of this character are disclosed in U.S. Pat. No. 1,085,012 issued Jan. 20, 1914, to Bopp; U.S. Pat. No. 1,179,863 issued Apr. 18, 1916, to Phillips; U.S. Pat. No. 1,484,126 issued Feb. 19, 1924, to Gaspard; U.S. Pat. No. 1,929,455 issued Oct. 10, 1933, to Smith; U.S. Pat. No. 2,629,437 issued Feb. 24, 1953, to Weeks; U.S. Pat. No. 2,719,538 issued Oct. 4, 1955, to Cole; U.S. Pat. No. 2,768,683 issued Oct. 20, 1956, to DeSchane; and U.S. Pat. No. 2,852,072 issued Sept. 16, 1958, to Alfrey.

The last four of the patents disclose control units of the currently marketed, so-called "waterboy" type. The control unit is attached directly to a faucet and connected by a hose to a sprinkler. The mechanical timer of the unit is set, opening the control unit valve, and the faucet opened. Water flows to the sprinkler until the timer runs down (usually 30–90 minutes). The control unit valve then closes and remains so until the timer is manually reset.

Control units of the type just described have a number of disadvantages.

One of these is that the timer must be manually reset for each flow control cycle.

Also, this type of control lacks versatility. The period over which the timer can exercise control is limited; and, more important, such units cannot be provided with auxiliary controls.

For example, it is often desirable to make provisions in a lawn sprinkling system for interrupting the sprinkling during periods of rainfall. Modification of a mechanical timer to function in the manner is impractical economically if not technically.

Also, control units of the character just described are not capable of being modified to control remotely located options such as flow control valves, pumps, etc.

Another disadvantage of fluid flow control units with mechanical timers is that the dust and moisture encountered in outdoor operation can cause failures or unreliable operation.

Fluid flow system controls with electric, clock-type timers have also been proposed. Representative controllers of this type are disclosed in U.S. Pat. No. 2,599,862 issued June 10, 1952, to Ray; U.S. Pat. No. 2,754,150 issued July 10, 1956, to Edelman; U.S. Pat. No. 2,864,650 issued Dec. 16, 1958, to Delamater; and U.S. Pat. No. 3,212,714 issued Oct. 19, 1965, to Davis.

These controllers have the advantage over mechanical timed controllers in that the timing cycle is automatically repetitive. Therefore, the timer need not be reset for each watering or other flow cycle. However, the controllers with electric, clock-type timers heretofore proposed have disadvantages which are equally, if not more, serious than those appurtenant to controllers with mechanical timers.

As shown by the patents last mentioned above, flow system controllers with electrically-operated timers as heretofore envisioned typically include, in addition to the unit in which the timer is housed, a remotely disposed solenoid valve and a control device; such as, a soil moisture probe or a rain switch. The solenoid valve and the control device are both connected by external electrical lines to the timer unit which is connected, also by external conductors, to an electrical power source.

Two additional examples of these types of controllers are U.S. Pat. No. 3,118,606 issued on Jan. 21, 1964 to Rotunda, and U.S. Pat. No. 3,207,866 issued on Sept. 21, 1965 to Hicks.

One of the more important advantages of my invention is that it provides an economic, practical, and quickly installable automatic lawn sprinkler control system that is equally adaptable to both above ground and underground home type lawn electrical timer controlled sprinkler systems. For example, it may provide means for the average homeowner to economically sprinkle residential lots of the order of $\frac{1}{4}$–3 acres using commercially available above ground garden hoses and lawn sprinklers of the rotary, impact, and wave variety.

Another important advantage of the novel invention is that it can be economically packaged for inside installation wherein conventional plumbing is extended to the home exterior where conventional garden hoses and sprinklers are attached, or it may be economically hermetically packaged for outside installation either on a semi-portable stanchion or directly on the outlet of a conventional faucet. Further, the invention permits permanent inside installation in conjunction with outside semi-portable auxiliary loads, such as, above ground control valves.

Another important objective of the present invention is to provide the residential homeowner with a simple lawn sprinkling system that can provide sprinkling time intervals as short as 10–15 minutes or as extensive as 2–6 hours in order to provide complete sprinkling flexibility in consonance with vegetation requirements, local water pressure, and individual home plumbing criterion. Additionally, because of the increase value of water it is necessary that automatic lawn sprinkling be accomplished only on certain designated days and many local municipality laws require that lawn sprinkling be accomplished strictly on those days. Therefore, means must be provided to enable automatic sprinkling on certain predetermined days; such as, every other day, every third day, or on given combinations of days.

Another important objective of the present invention is to provide a simple electrical manual override switch that turns the lawn sprinkler on and off without interferring with the operation of the timer clock and provides manual operation that is independent of the clock cycle and of the rainfall status.

It is another important object of the present invention to provide novel, improved automatic lawn sprinkler systems which are capable of shutting off the sprinklers during periods of natural rainfall, but do not have the disadvantages of previously known systems of this type.

In general, the novel lawn sprinkling systems provided by the present invention are characterized by one or more electrical loads, such as electromagnetically controlled valves, in series with an electric timer-operated switch and an auxiliary sensor switch, such as a non-resistive rain-operated switch. The timer is set for a given interval of time depending upon the locality, annual rainfall, type of vegetation being irrigated, etc. At a given time within each 24 hour interval, the timer closes the timer-operated switch, the electromagnetic valve (or loads) opens, and sprinkling occurs. However, if natural rainfall occurs while the flow control valve is open, the rain switch closes; and, sprinkling ceases while the natural rainfall continues.

If the natural rainfall continues beyond the end of the preset increment of time, the sprinkler does not resume operation until the 24 hour period has elapsed. However, if the natural rainfall ends before completion of the preset time increment, the main switch opens; and, sprinkling is resumed. In this manner, lawns may be provided with automatic irrigation for a preselected portion of each 24 hour period, the irrigation consisting of artificial rainfall or natural rainfall, or a combination of both.

Another important objective of the present invention is to prevent load or sprinkler valve "flutter" during intermittant rainfall or when rainfall first begins, due to intermittant opening and closing of sensor or rain switch; while still retaining sprinkler operation that is coterminous with rainfall.

Another important objective of the present invention is to provide a sensor or rain alarm that will signal when rainfall begins and is completely independent of the sprinkler's operation. This alarm is remotely mounted and, in this novel circuit, provides full utilization of the sprinkler control at negligent additional manufacturing cost.

Another objective of the present invention is to provide an outdoor electrical timer or sprinkler control that is hermetically sealed. During past years, while it has been assumed that hermetically sealed sprinkler controls are an obvious extension of non-weatherproof models, the successful introduction of practical outdoor controls has not borne out this concept. Further, increasing importance placed on safety (particularly in connection with outdoor electrified appliances) has been brought clearly into focus by the passage of the U.S. Consumer Product Safety Act. This resulting establishment of the U.S. Consumer Safety Commission now requires that manufacturers develop consumer products both from the standpoint of economic manufacturability and consumer user safety. Accordingly, this is probably the most novel and important feature of the subject invention. A unique gasket sealing arrangement is provided that enables two degrees of hermetic sealing; one for encasing interior electrified components, and a second degree for panel controls. For example, if the consumer user should forget to close the cover of the novel control, environmental protection of the electrified components is insured and electrical shock hazzard is avoided. At the same time, the novel arrangement, of inexpensive casing component, makes the unique control economically manufacturable.

Another important objective of the present invention is to provide an outdoor hermetically sealed electrical timer, or sprinkler, control that is safe from electrical shock hazzard and is also, economically attractive for manufacturing. During the last decade, great effort has been placed upon the development of ground-fault circuit-interrupters which sense line current balance-to-ground and automatically interrupt a circuit; thereby, protecting the circuit user from electrical shock, should a short to ground cause such a circuit imbalance. Manufacturing economics, however, in conjunction with operational complexity, have resulted in their consumer acceptance being less than effective.

A novel, practical, and economic approach is disclosed in the present invention which has its most desirable feature in its simplicity and operational reliability. A novel, 3-wire, grounded plug is provided and reduces line voltage to 12 or 24 volts within the unique plug; wherein, a grounded-barrier constant-energy stepdown transformer is utilized. Cooling fins on the outer surface of the plug, make possible this unique invention. In this arrangement, only low voltage is available between the plug and the timer control, or lawn sprinkler. Additionally, use of a dead-front type plug and a low durometer seal insures a plug-to-outdoor-receptable hermetic seal.

Another important advantage of the present invention is a simple means for attaching the hermetically sealed casing directly to a conventional faucet outlet and connecting to the sprinkler control one or two garden hoses, and associated sprinklers; thus, providing an automatic sprinkler system that requires no installation. This portable unit is then simply plugged into a conventional electrical outlet receptacle. The rain-switch housing is tiltable to insure its correct inclination for various faucet outlet angles.

In their simplest versions, my novel electrical timer or sprinkler flow control systems include a casing in which a solenoid-operated valve, or electrical load, and all of the controls essential for the operation of the valve, can be housed. The only connections to the unit include: a power cord for connecting the electrical components of the unit to a power source; fluid or load, inlet and outlet connections; optional circuit connections for auxiliary control devices responsive to parameters such as precipitation, pressure, and humidity level; and, for other flow controlling and/or effecting devices, such as, pumps and remotely located valves.

One of the important advantages of the controllers just described is that all of the electrical components necessary for timer control can be integrated into a single portable unit with only one external electrical connection.

This makes the system compact; and, it can be readily moved from place to place and installed when and where it is needed.

The control system is simple and inexpensive to manufacuture. Installation can be accomplished quickly and without special skills or tools as this typically involves only connecting hoses to the fluid couplings of the unit and plugging its power cable into a socket or jack.

Another important advantage of my novel flow control as described above, is that by requiring only one external electrical line, it poses less of a safety problem, both during installation and operation. This line can be very short if the control is located near an outlet or other electrical power source. This virtually eliminates the electrical shock hazzard.

The entire control unit hermetically sealed, together with the simplicity of the system, makes the unit exceptionally reliable. The hermetically sealed casing also contributes to the low cost of the system as it renders unnecessary the use of shields, and the like, to protect the components of the unit against dust and moisture.

Another important advantage of the control units I have invented is their versatility. Auxiliary control devices; such as, soil moisture detectors, auxiliary sensor switches, and rain switches; auxiliary flow devices; such as, booster pumps, additional solenoid-operated valves and appliances, can be added by plugging them into sockets or jacks opening onto the exterior of the control unit casing. No access to the interior of the control unit casing is required which will be appreciated as a decided benefit by those conversant in the arts to which the present invention relates.

Another important advantage of my novel control units is that the operating cycle is repetitive. This makes them superior to those which have mechanical timers and must accordingly be manually reset after each operating cycle.

The feature just discussed, also, distinguished my novel units from flow control systems shown in U.S. Pat. No. 2,651,361 issued Sept. 8, 1953, to Smith. Smith's controller employs a one-shot timer that requires resetting between operating cycles. Also, the Smith mechanism is too complex for the applications for which my novel control units are intended; and, it lacks the versatility of my flow controls in that the addition of auxiliary control and flow devices to the illustrated system would be impractical.

From the foregoing, it will be apparent to the reader that one important object of the invention resides in the provision of novel, improved electrical timer switch control apparatus which may be used for controlling outdoor appliances, lawn sprinkling and other fluid flow systems.

Other important but more specific objects of the invention reside in the provision of sprinkler flow, or electrical control systems:

1. which are adaptable to both above and below ground sprinkler systems;
2. which can be adapted for indoor or outdoor installation;
3. which automatically operate on a repetitive cycle, daily or on a preselected combination of days;
4. which will not operate during rainfall if rain occurs during the automatic operate time interval;
5. which will resume sprinkling if rainfall stops during the operate time interval;
6. which will not permit lawn sprinkler to flutter on and off during light rainfall but will provide control coterminously with rainfall;
7. which provide manual sprinkler override control;
8. which provide a simple reliable rain alarm;
9. which provide an outdoor hermetically sealed casing that is electrical shock hazzard proof;
10. which provide an electrical plug that is air cooled;
11. which provide a casing unit that is attachable to and is supported by a conventional outdoor water faucet;
12. which are simple and compact and are of a unitary construction, all of the components being housed in a single casing which can be hermetically sealed to keep foreign substances out;
13. which are portable and can be readily moved from place to place;
14. which are comparatively inexpensive to manufacture;
15. which are highly reliable in operation;
16. which can be installed easily, quickly, and without the exercise of special skills or the use of special tools;
17. which are safe to operate and to install;
18. which, in conjunction with the preceding object, are characterized by a minimum of exposed electrical lines;
19. which have a high degree of versatility;
20. in which, in conjunction with the preceding object, provision is made for easily and quickly adding auxiliary flow and/or control devices to the basic controls; and,
21. which have various combinations of the foregoing attributes.

Other important objects, features, and additional advantages of the invention will become apparent from the appended claims and as the ensuing detailed description and discussion proceeds in conjunction with the accompanying drawing, in which:

Claims to combination with and details of such other controls, and particularly as relating to lawn sprinkling, are contained in my prior copending application, Ser. No. 625,350, filed Oct. 25, 1975, now U.S. Pat. No. 4,014,359 which is included herein by reference.

Figure 1:
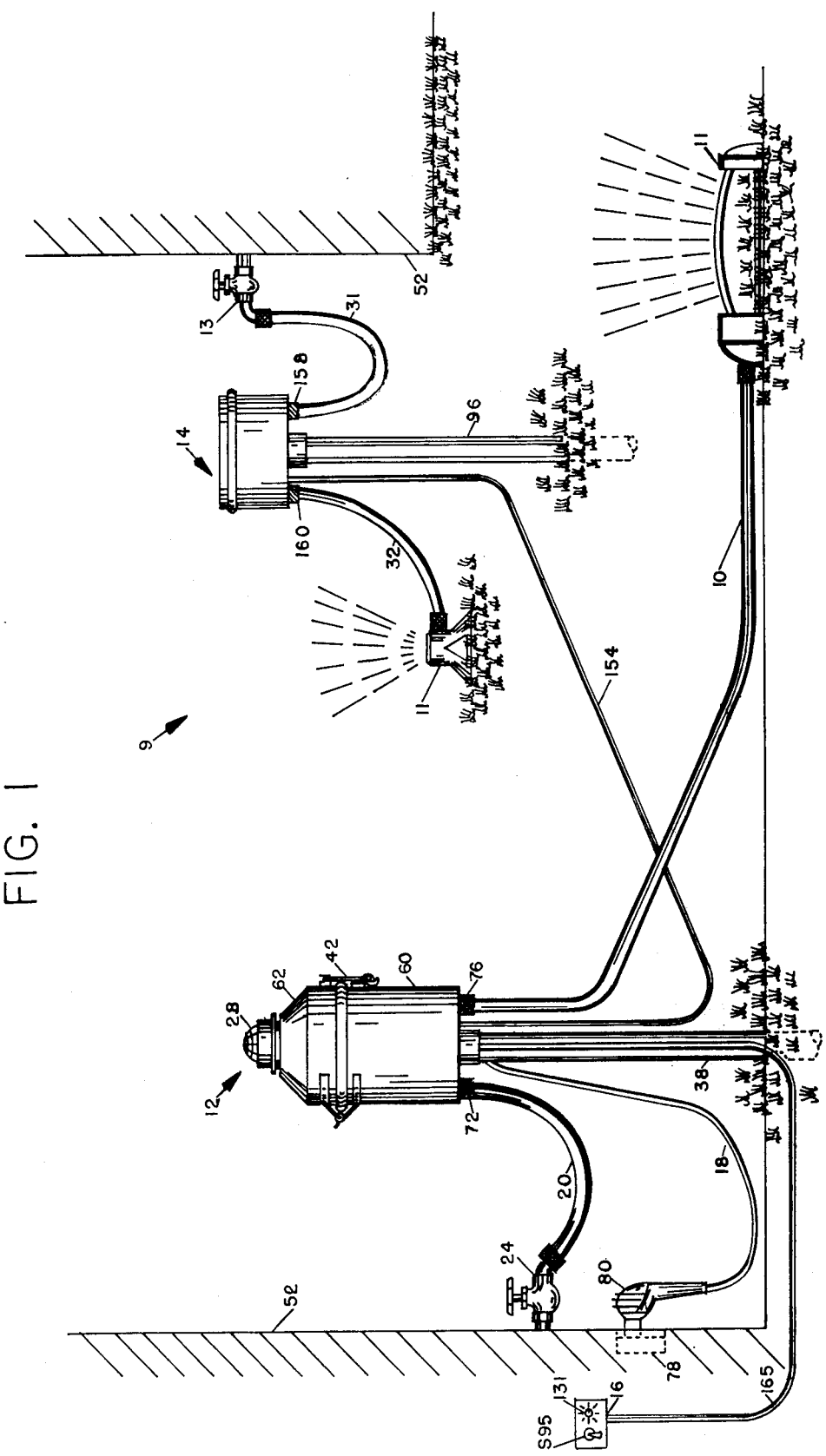
FIG. 1 is a somewhat pictorial illustration of a sprinkler flow, or electrical timer control system in accord with the principals of the present invention.
Figure 2:
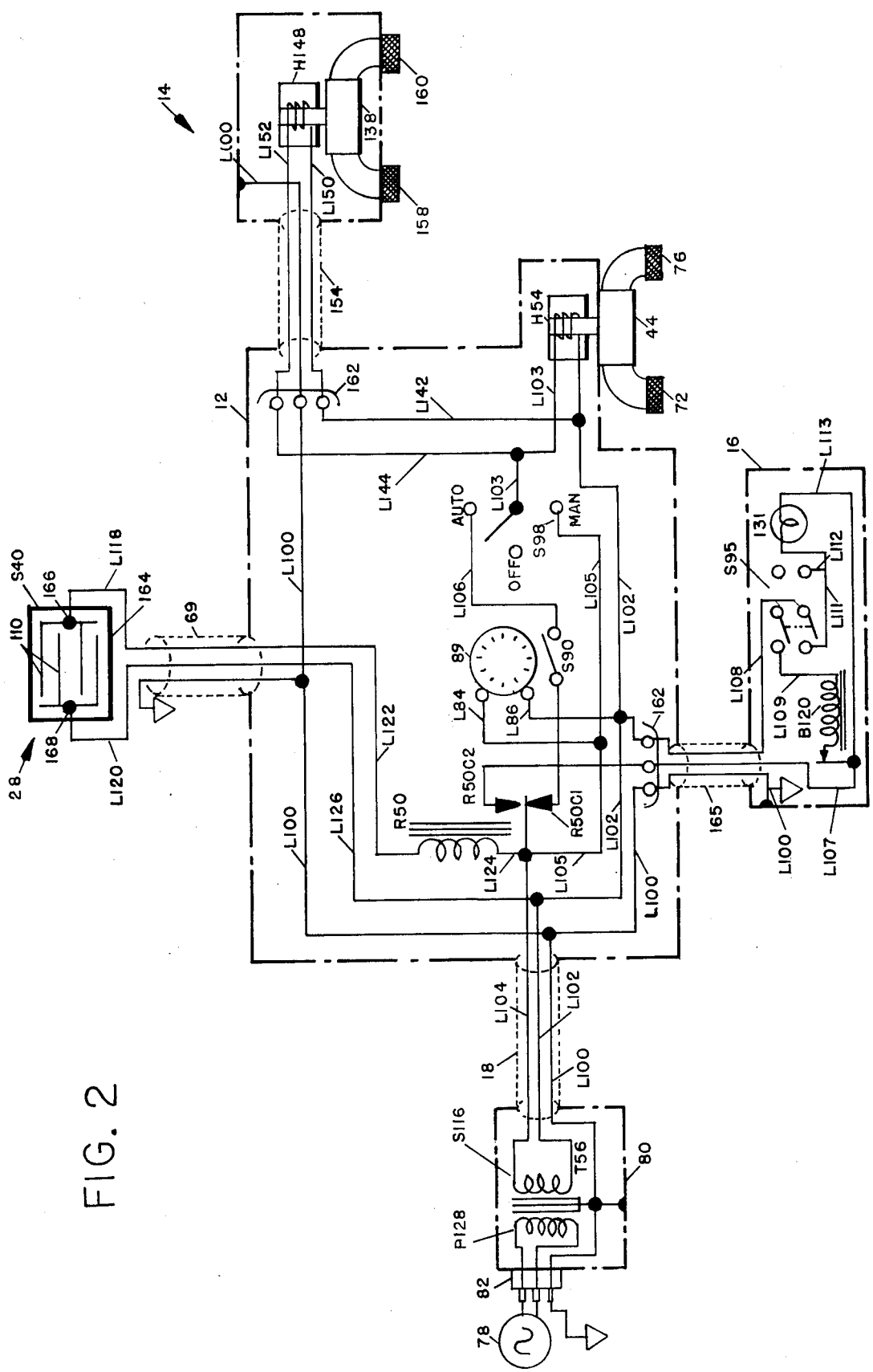
FIG. 2 is a schematic diagram of the sprinkler flow, or electrical timer control system of FIG. 1.

Referring now to the drawing, FIGS. 1 and 2 disclose a sprinkler or electrical timer control system 12 in accord with the principals of the present invention; including an electrical timer master control control unit 12 for automatically controlling an electrical load; such as for example, the flow of liquid through a flexible conduit 10 by means of flow valve 44.

The typical lawn sprinkler flow control system includes a flow control 12 with an electrically actuated flow valve 44 controlling fluid flow in the distribution system; comprising water faucet 24, flexible flow conduit 10 and 20, and lawn sprinkler 11. As shown in FIGS. 1 and 2, the typical lawn sprinkler flow control system may include an auxiliary outdoor valve 14 that contains an electrical actuated valve 138 connected to the flow control by means of cable 154. The auxiliary outdoor valve or load 14, may receive fluid from a second outdoor faucet 13 through flexible fluid conduit 31 and may provide lawn irrigation by means of a second sprinkler 11 connected; thereto, by flexible fluid conduit 32. Flexible fluid conduits are attached by fittings 158 and 160.

It is understood that both fluid conduits 10 and 32 may each be connected to 2 or more sprinkler heads 11 by means of conventional fluid fitting "T"'s inserted in flexible fluid lines 10 and 32.

The flow control 12 causes flow valves 44 and 138 to open and close; thus, controlling the emission of fluid from sprinklers 11. As shown in FIG. 2, the electrical actuator H148 of valve 138 is connected in parallel with the electrical actuator H54 of valve 44; thereby, operating concurrently in unison. Electrical power for flow control 12 is provided from a conventional exterior 105-125 volt, 60 cycle AC, outdoor electrical duplex receptacle 78, into which is plugged the unique extension power plug 80, which is connected to flow control 12 by a 3-wire grounded extension cable 18.

Figure 6:
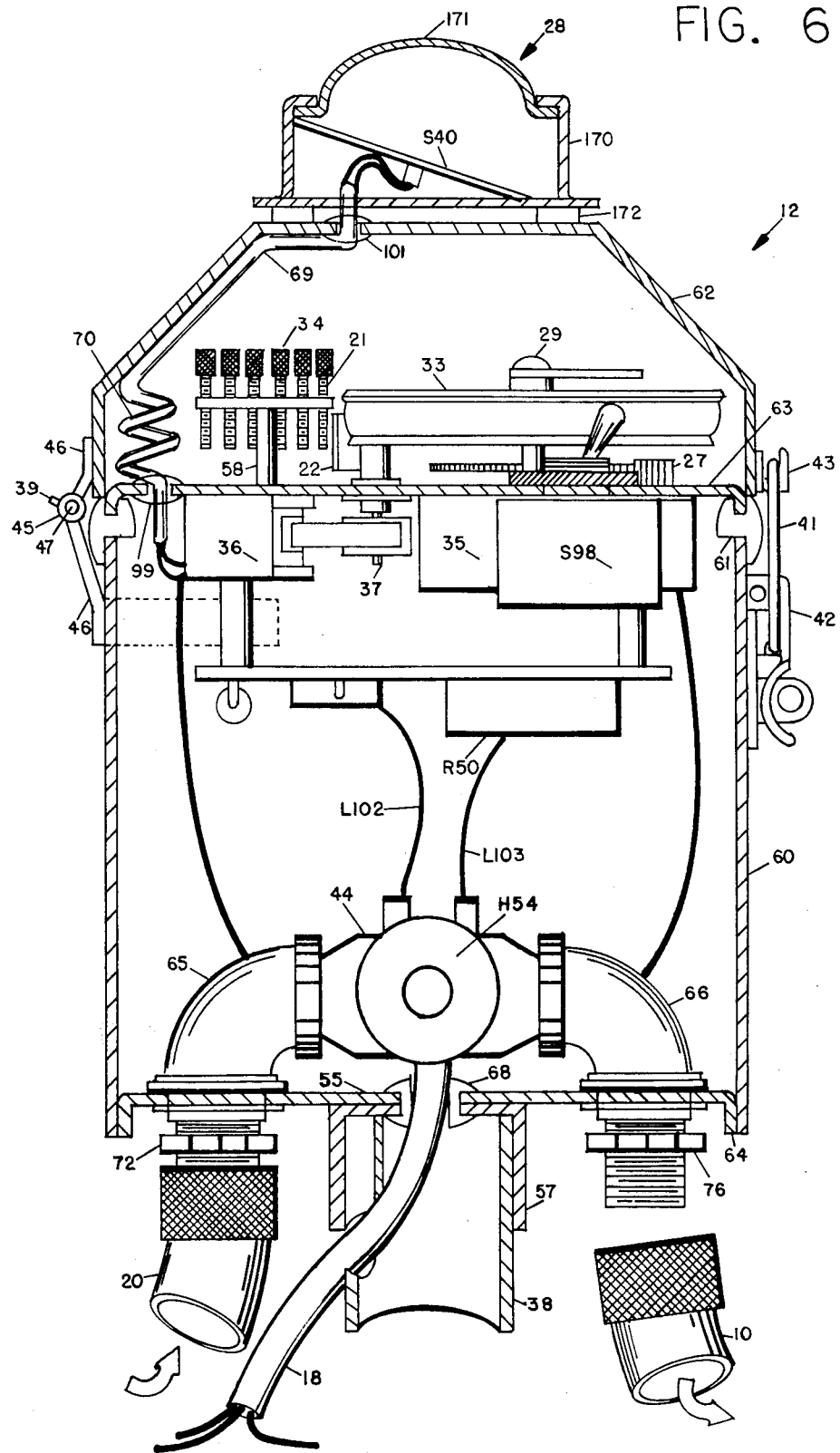
FIG. 6 is an elevation of a sprinkler flow, or electrical timer control in accord with the principals of the present invention, the casing of the unit being broken away to show its internal components.

Both flow control 12 and auxiliary outdoor valve 14 are supported on tubular vertical stanchions 38 and 96 respectively and respective control cables 18 and 154 may be terminated into the casings of the control units, either by use of hermetic strain reliefs 87 (see FIGS. 9 and 15) or by insertion relief through the tubular stanchion into the units (see FIG. 6). Bottom plates of both units are provided with 2 cord holes, and one hermetic hole plug 129 (see FIG. 9) provided thereby, enabling the same manufacturing assembly line to produce flow units adapted with extension cords or without such cables intending the latter units for permanent wiring using the upper extremity of the vertical stanchion as a wiring connector box (see FIG. 14). Additionally, extension cables 18 and 154 may be connected to control units 12 and 14 respectively, by means of a slotted hole in stanchions 38 and/or 96 (see FIGS. 6 and 14); thereby, enabling manufacture of control units having only one extension cable hole in the bottom plate thereof. In this manner, the control unit may be wired with a flexible extension cord 18 or permanently wired with wires 97 (see FIG. 14) located inside the vertical stanchion 38 or 96. For example, wires 154, of FIG. 2, could be placed into stanchion 96, of FIG. 1.

Also, shown in FIGS. 1 and 2, a remote audiovisual rain alarm 16 audibly and visually signals during rainfall. Incorporated into the alarm is a three position switch S95 which selects audiovisual alarm, visual alarm only, or no alarm, in accordance with the desires of the user. Remote rain alarm 16 is connected to flow control 12 by wiring cable 165.

It is understood that the audiovisual alarm 16 may as well be incorporated in the flow control 12, and that a combination of local and remote alarms may be provided. The flow control 12 is mechanized so that when power plug 80 is energized, rain alarm capability is provided, independent of other operational features and requirements of flow control 12. Rain alarm will operate independently of sprinkler operation.

Flow control 12 comprises a lower casing 60 and a cover lid 62 that contain a timer clock 89, an electrically actuated fluid valve 44, and fluid conduit connectors 72 and 76 for attaching inlet and outlet flexible fluid conduits 10 and 20 respectively. The timer switch contact S90 is mechanized to cause the fluid valve 44 to open and close during one or more contiguous or non-contiguous 15 minute time intervals during each 24 hour daily period. Additionally, one or more contiguous or non-contiguous days may be skipped; thus, providing for lawn sprinkling on certain days, or combination of days, prescribed by local law in areas afflicted with water shortages.

Figure 4:
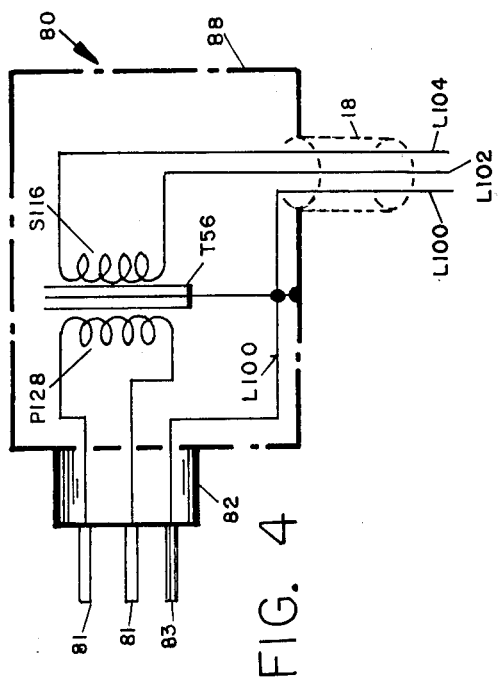
FIG. 4 is a schematic diagram of the extension plug of FIG. 3.
Figure 3:
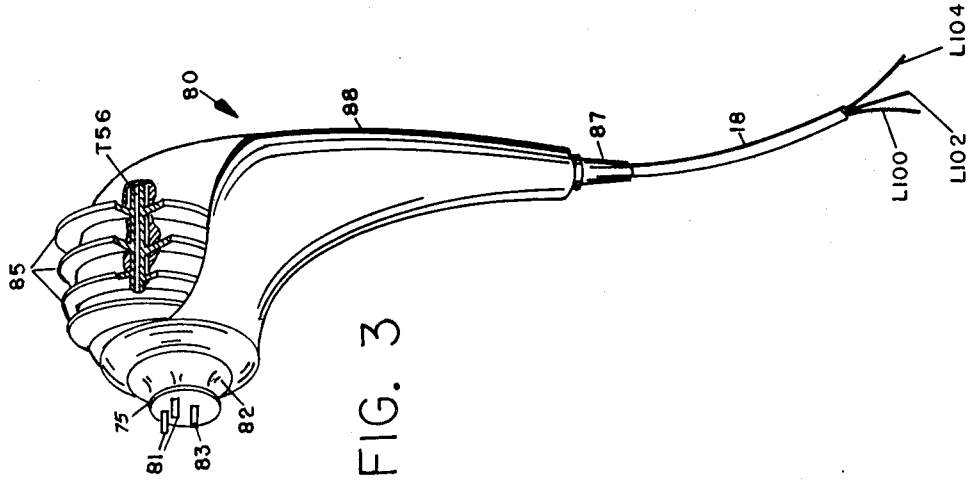
FIG. 3 is a somewhat pictorial illustration of the extension plug which provides the grounded-barrier constant energy source of operating voltage in accord with the principals of the present invention.

Referring now to FIG. 3, a low voltage power source, for operation of control unit 12 may by provided by power plug 80 which comprises a casing 88, a dead-front 3-wire grounded connector 82 containing contact pins 81 and grounded pin 83, grounded 3-wire extension cable, 18 terminated in plug casing 88 by strain relief 87, and within plug 80 a stepdown transformer T56, the casing of which, is of unitary construction in combination with plug casing 88. The transformer frame lamination is extended through the insulated plug casing 88 to form cooling fins 85. In order to achieve protection from overheating, in conjunction with the cooling fins 85, a class II, energy-limited, transformer is incorporated. For example, if extension cable 18 were inadvertently severed, while plugged into power source 78 (see FIG. 1), causing conductors L102 and L104 to contact, this unique power plug would not cause a fire or electrical shock hazzard because of the novel combination of both the transformer energy-limiting characteristic and utilization of the exterior cooling fins. Thermal energy generated in the interior of plug 80 flows along cooling fins 85 and is radiated into the atmosphere therefrom. In addition, the metallic construction of the conventional electrical outlet 78 is also utilized to conduct generated heat away from the isothermal interior environment of power plug 80. Referring now to FIG. 4, the ground pin 83 is electrically and thermally connected to power plug 80, casing 88, which is also an integral part of the laminated transformer coil core frame. During continuous operation of the transformer, heat is generated and is further conducted via grounding pin 83, to electrical outlet box 78, which is also connected to attached structure 52 (shown in FIG. 1) which serves as a thermal heat sink.

Since the rain alarm 16 (see FIGS. 1 and 2) requires continuous residual operation of transformer T56, the above unique arrangement is required for the operation of the sprinkler control because absolute hermetic sealing of the power plug 80 is required, due to its continuous outdoor use. Additionally, an inspection of FIGS. 2 and 6, reveals that power consumed from transformer T56, secondary S116, is limited to that required to operate timer motor 35, except during actual lawn sprinkling and/or rain alarm activated operations. This fact, in conjunction with the energy-limiting transformer, results in a unique sprinkler control in which available consumer electrical energy is conserved.

Figure 5:
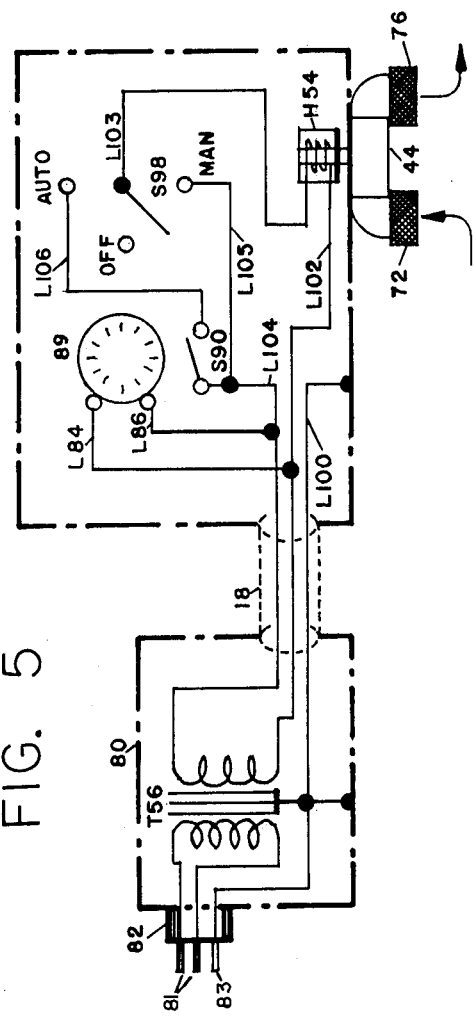
FIG. 5 shows an alternate valve operating control arrangement for sprinkler controls in accord with the principals of the present invention.

Referring now to FIGS. 4 and 5, a source of electrical voltage of value 105–125 volts, 60 cps, AC, is connected to pins 81 of dead-front connector 82; to which, pins are also connected the primary winding P128 of stepdown transformer T56; and, secondary winding S116 thereof, provides a source of low operating voltage to cable 18 conductors L102 and L104. Dead-front connector ground pin 83 is connected to plug casing 88, and said casing may be of double insulation to further insure protection from electrical shock hazzard. Finally, transformer T56 may also contain a metallic, electrically, conductive barrier between the primary coil P128 and secondary coil S116, which barrier is electrically grounded to the power plug case; thereby absolutely preventing electrical shock due to transformer winding break-down. When comparing this novel arrangement with ground-fault circuit-interrupter (G.F.C.I.) devices, that are intended to provide the same protection, this power plug's operational simplicity, reliability, and superiority is very evident. Additionally, the said power plug can be manufactured for a fraction of the cost of comparable G.F.C.I. equipments. Finally, because of the low cost of the power plug, shown in FIGS. 3 and 4, it is economically feasible to provide this electrical shock protection to each manufactured unit rather than restricting its application to installation in electrical outlet receptacles as in the case of currently available G.F.C.I protective devices. As required by provisions of the National Electrical Code, and for manufacturer's protection from ever increasing consumer public liability, in view of U.S. consumer safety acts, such electrical shock protective means are absolutely essential. Therefore, the means herein invented provide an economically practical arrangement that is superior to other currently available art.

Figure 7:
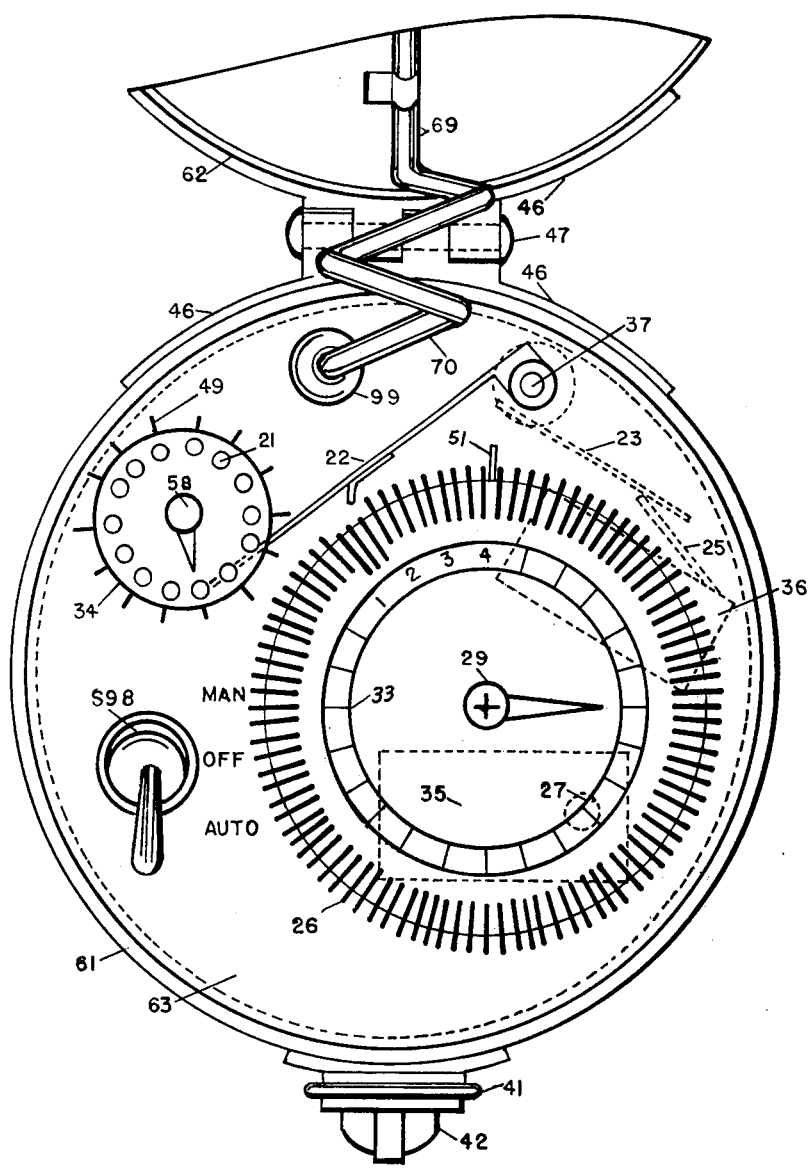
FIG. 7 is a somewhat pictorial illustrated plan view of the operating control panel in accord with the principals of the present invention, showing clock timer and mode switch.

Referring now to FIGS. 5 and 7, a sprinkler flow control is shown, that simply illustrates the operation of the intended invention. Voltage is provided on leads L104 and L102 through cable 18, through timer switch contact S90, to valve 44 solenoid coil H54, connected in series with mode selector switch S98. When mode selector switch S98 is in "automatic" position, the valve actuator H54, is energized via L104, S90, L106, L103, through coil H54 to L102; in which mode, valve 44 will open and close as clock driven switch contact S90 opens and closes. Electrical clock driving means 35 are energized from the source of operating voltage via conductors L102, L104, via connecting conductors L84 and L86. If mode switch S98 is manipulated into its "off" position, it is obvious that valve solenoid H54 will be inoperative independently of all circuit means, since in "off" position all switch contacts are disconnected. When mode switch S98 is manipulated into its "manual" position, valve solenoid H54 is connected to operating voltage source conductor L102 and to conductor L104 via L103, mode switch contact, and L105; thus, bypassing clock timer switch contact S90. Immediately upon switching to "manual" position, valve 44 will open and remain open independently of clock timer 89. It is obvious that valve actuator H54 could be any suitable electrical load or appliance, either located in the interior of or exterior to, the electrical timer switch control casing 60 shown in FIG. 6. Also, transformer T56 could be eliminated and conductors 81 connected directly to conductors L102 and L104; thereby, causing load H54 to operate directly from power source 78 as evident from FIGS. 2 and 5.

Referring to FIGS. 1 and 6, the timer control 12 is housed in a casing comprising a lower main casing 60 which is a section of cylindrical electric welded steel tubing into the bottom end, of which, is attached a bottom cover or plate 55 and onto the top end, of which, is placed a flanged control panel 63 of inside and outside flange diameters that are equivalent to corresponding inside and outside diameters of main casing cylinder 60. Connecting the control panel 63 flange and the upper peripheral extremity of main casing 60 is an annular gasket 61 of "H" type cross section; wherein the lower inside leg of the "H" type cross section is absent. This enables the flange of control panel 63 to be peripherally inserted into the gasket and the remaining outer peripheral gasket 61 lip to be telescoped over the upper peripheral edge of casing 60, as shown in FIG. 6. Panel 63 is pulled, by means of appropriate fasteners, (not shown) into a circumferential hermetic seal against the main casing 60.

Figure 8:
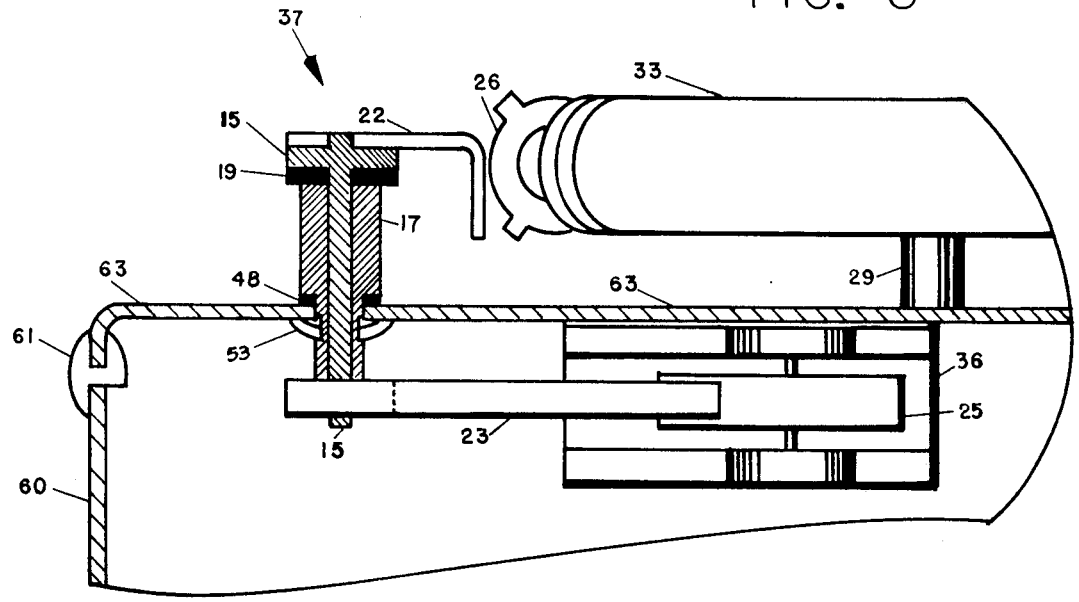
FIG. 8 is a partial elevation of the operating control panel in accord with the principals of the present invention showing the hermetically sealed pivot that actuates the clock switch.

Referring to FIGS. 6 and 7, the clock timer 89 is supported on the top and bottom faces of control panel 63. FIG. 7 shows a plan view of clock timer 89 attached to the top face of control panel 63. Shown in broken line configuration are those clock 89 elements attached to the bottom or interior surface of control panel 63. In this novel configuration, all electrified components of clock timer 89, including a spring tensioned time switch 36 and timer drive motor 35, are attached on the bottom of control panel 63, within the hermetically sealed interior of control casing 60. A combined 24 hour time wheel and clock face 33, along with its support post bearing 29, are supported on the top, or exterior, surface of control panel 63. Also, supported therein are 14 day time wheel 34 and its support post bearing 58, timer actuator level 22, and tubular bushing assembly 37, which extends through control panel 63. Referring to FIGS. 7 and 8, timer actuator lever 22 is mechanically connected to shaft 15 which extends through the tubular bearing 17. As shown in FIG. 8, vertical shaft 15 may pivot within concentric tubular bearing 17 in accordance with angular movement of radially connected timer actuator arm 22. Also, tubular bearing 17 is hermetically sealed to panel 63 exterior surface by annular seal 48. A concentric cup like seal 19 is used to provide a hermetic seal between tubular bearing 17 and pivot shaft 15. Also, tubular bearing 17 has a concentric slot undercut into which is inserted a beveled snap ring 53, that grips tubular pivot 17 and simultaneously bears forcefully against the bottom surface of control panel 63; thereby, compressing seal 48. Attached to shaft 15 by an offset bushing is switch actuator lever 23 which contacts spring tensioned clock switch 36, actuator arm 25. Accordingly, angular movement of the timer actuator arm 22, located on the exterior surface of panel 63, will cause, through hermetically sealed bearing 37 and switch actuator arm 23, the spring tensioned switch 36 to open and close.

FIG. 7 shows a somewhat conventional timer, and spaced around the periphery of this time wheel/clock face 33, are 96 concentric flip tabs 26 that are partially rotatable radially such that, when "flipped" towards the timing wheel center 29; timer actuator lever 22 may rotate somewhat counterclockwise about pivot shaft 37; thereby, causing switch actuator level 23 to close switch 36. Accordingly, clock desired timing interval may be selected in 15 minute intervals, simply by "rotating" individual tabs 26 about their axis radially clockwise towards time wheel 33 center post 29. In FIG. 7, a 45 minute time interval is shown set on time wheel 33 between 1 and 2 oclock.

Located adjacent to and overhanging end of timer actuator lever 22 is a somewhat conventional 14 day wheel 34 supported on support post bearing 58 and comprising 14 teeth 49 and 14 mechanically actuated tabs 21 which, when depressed, prevent timer actuator lever 22 from closing timer switch 36, even though time interval tabs 26 are favorably so adjusted. Accordingly, to set timer clock 89 to skip one or more days, in any biweekly combination, it is only necessary to depress the correct combination of tabs 21, since for each revolution of timer wheel 33, 14 day wheel 34 will rotate 1/14th of a revolution. This is accomplished by permanently extended tab 51 engaging one extended tooth 49, per revolution of wheel 33, and causing the 14 day wheel 34 to rotate 1/14th of a revolution. The 14 day time wheel 34 is calibrated in 14 consecutive days, each associated with a given skip-a-day tab 21. The combination clock wheel/timeface 33 is calibrated in 24 hourly time intervals and rotates once every 24 hours. Clock wheel 33 is propelled by gear 27 extended through a hermetic sealed bushing in panel 63 and providing planetary drive for clock wheel 33. Propulsion is provided by electric motor 35. Also, shown in FIGS. 6 and 7, is the automatic-off-manual mode switch S98 which could as well be of rotary type providing that a hermetic seal protects the interior of the switch and preserves casing interior integrity.

Figure 9:
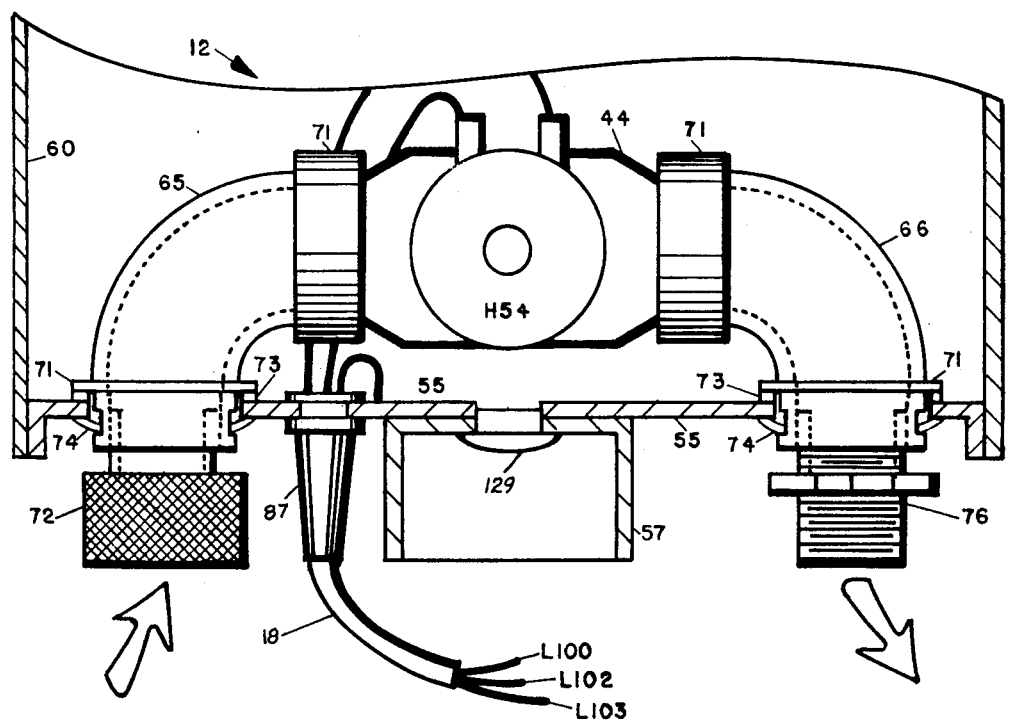
FIG. 9 is an elevation view of the bottom cover that shows the valve supported; therefrom, in accord with the principals of the present invention.

FIG. 6 and FIG. 9 show the electromagnetically actuated solenoid H54 horizontally attached to fluid control valve 44. Attached to valve inlet and outlet are two 90 degree commercially available plumbing elbows 65 and 66 respectively. The arrangement, shown in FIG. 9, is unique in that it enables valve 44 to be self supporting without special support fixtures or special inlet and outlet valve ports; thereby, providing a design that is economically feasible to manufacture. First, a low cost nylon casing type valve can be used. Secondly, the valve can be adapted to exterior connections 72 and 76 by means of conventional plumbing elbows 65 and 66; and thirdly, these plumbing elbows may be easily adapted to extend through the bottom plate 55 such that the connection of exterior flexible conduits 10 and 20 to fittings 76 and 72 respectively can not cause a water leak into the electrified interior of casing 60; thereby, causing an electrical shock hazzard. As shown, each 90° elbow has a conventional shoulder 71 at each end. One such shoulder 71 of each elbow is undercut providing a tube of lesser outer diameter than that of the shoulder. Valve 44 with elbows 65/66 attached is fitted with concentric seals 73, which are made of neoprene or other suitable material, and inserted through the two holes shown on the bottom cover. Gaskets 73 form a hermetic seal at each hole. Concentrically in the exterior surface of shoulders 71 are under cut slots into which are inserted beveled concentric snap rings 74. These rings bear against bottom cover 55; thereby, causing compression of seals 73 and a hermetic seal results. Further, the valve assembly comprising valve 44, actuator H54, and elbows 65/66 is entirely self supporting on bottom cover 55.

Referring to FIGS. 2 and 6, main casing 60 is fitted with a top cover 62 of frustoconical shape, that is hinged 45 at one diametric end and has a draw pull catch 42 at the other end thereof. Because of the unique gasket 61 design, upper cover 62 telescopes over control panel 63 flange and the top cover 62 seals peripherally against the upper outer annular surface of gasket 61.

Figure 10:
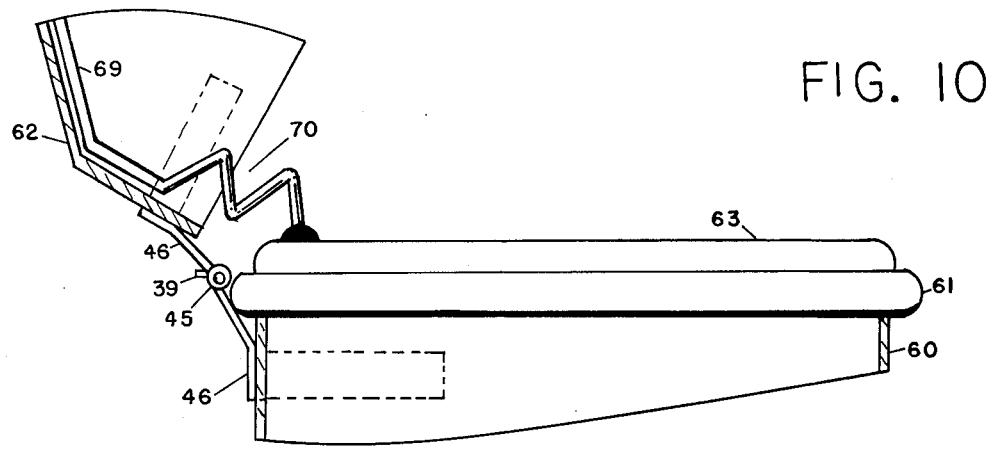
FIG. 10 is a partial cut-away elevation that shows the rain switch cable coil type hinge between lower main casing and top cover in accord with the principals of the present invention.

The hinge 45 is uniquely arranged to be fabricated from standard commercially available hinge stock. As shown in FIG. 10 the hinge leaves 46 are angled lengthwise to permit gasket 61 to be spanned. A portion of each leaf 46, a number of hinge links, and portion of pin 47 are removed from each end of the hinge. Finally, the four remaining extended leaf tabs 46 are arced to concentrically grasp the exterior surfaces of main casing 60 and top cover 62.

Perpendicularly inserted into one bottom leaf link of hinge 45 is a pin 39 which engages top leaf 46 and prevents its further rotation about pin 47. This limits rotation of top cover 62, with respect to main casing 60, to a given predetermined value that may be selected by judicious placement of pin 39 on hinge 45 link.

Diametrically opposite to hinge 45 on control casing is located a draw pull catch 42 which has a loop 41 that engages strike 43. Catch 42 is attached on exterior surface of main casing 60. Strike 43 is attached on exterior extremity of top cover 62. Loop 41 is attached to catch 42, spans gasket 61, and pulls strike 43. Catch 42 and lower hinge leaf 46 are positioned on main casing member 60; and, strike 43 and upper hinge leaf 46 are positioned on top cover 62, such that when catch 42 is closed a hermetic seal is formed between the peripheral extremity of top cover 62 and annular gasket 61.

Figure 14:
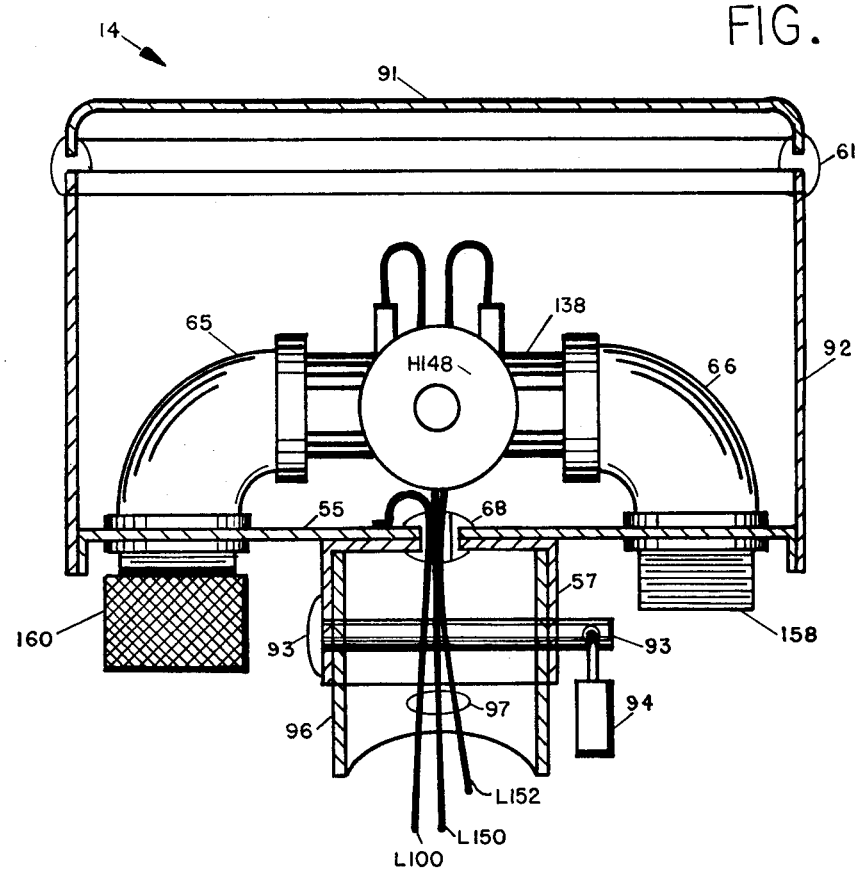
FIG. 14 is an elevation of an auxiliary outdoor valve or appliance showing the novel pin lock in accord with the principals of the present invention.

Referring to FIGS. 6, 9 and 14, control units 12 and 14 are supported by vertical stanchions 38 and 96 which are inserted into a cap 57 which is attached to bottom cover 55. Inserted perpendicularly through cap 57 and stachion 96 extremities is a flange headed pin 93 with a hole at the opposite end; into which is inserted a padlock 94, as shown in FIG. 14. This prevents theft of control units 12 and 14.

As shown in FIG. 6, electric cable 18 may also be attached to unit 12 through a slotted hole in the upper end of stachion 38. Cable 18 extends through hermetic grommet 68 in the center of bottom cover 55. If permanent installation of control unit 12 or 14 is desired, cable 18 may be deleted and hook-up wires 97 extended through grommet 68 (as shown in FIG. 14). Alternatively, cable 18 may be extended through bottom cover 55 and attached thereto by means of a hermetic sealed strain relief 87, as shown in FIG. 9. In this arrangement, a hermetically sealed plug 129 is inserted in the center hole in the bottom cover 55. In this arrangement, if permanent wiring of unit 12 is desired, cable 18, as shown, is removed from its hole in bottom cover 55, and plug 129 is inserted therein. Hermetic grommet 68 and hook-up wires 97 are then inserted in the vacant center hole of bottom cover 55 (as shown in FIG. 14). This unique arrangement enables the same manufacturing production line to assemble units 12 and 14 that are adaptable to units intended either for portable or permanent installation. For example, electric cord 18 and power plug 80 are used in models intended for portable installation, while hook-up wires 97 are used in models intended for permanent installation.

Referring to FIG. 2, dead-front 3-wire grounded connector 82 is energized by a source of operating voltage of the order of 105–125 volts, 60 cps, AC. In power plug 80, of which connector 82 is a part, stepdown transformer T56 reduces the voltage to 24 volts 60 cps. AC or to other appropriate values such as for example, 12 volts, 60 cps, AC. This source of low operating voltage is available on conductors L102 and L104 in Cable 18. Valve 44 actuator H54 is energized from L104 via relay contact R50C1, clock switch contact S90, L106, mode switch S98, L103 and L102. Accordingly, when relay R50 is de-energized, contact R50C1 is closed. When clock 89 switch contact S90 is closed and mode switch S98 is in automatic position, valve actuator H54 will be energized and valve 44 will open. If mode switch S98 is placed in off position, valve actuator H54 lead L103 will be disconnected and valve 44 will remain closed independently of S90 and R50 contacts. If mode switch S98 is placed in manual position, valve actuator H54 will be energized by L104, L105, L103 and L102 independently of R50 and S90 contacts. Accordingly, in automatic mode switch position, valve 44 will open and close as clock timer 89 causes switch contact S90 to open and close, as long as relay R50 contact R50C1 is closed.

In like manner, as shown in FIG. 2, outdoor control 14 auxiliary valve 138, if connected, will be opened and closed by means of low operating voltage applied to valve actuator H148 via conductors L150 and L152 in cable 154, connected to conductors L142 and L144 respectively in control unit 12.

Referring to FIGS. 2 and 6, attached to the exterior surface of control unit 12, top cover 62, is planimetric rain switch assembly 28 comprising spaced apart conductors 110 on rain switch S40 insulated base 164. Spaced apart conductors 110 are connected by terminals 166 and 168 to conductors L118/L122 and L120/L126 respectively, that are contained in hermetically sealed cable 69. A detailed description of the planimetric rain switch is given in U.S. Pat. No. 3,809,116 FIGS. 3, 4, 5, 6 and beginning with line 62 of column 10.

Referring to FIGS. 2 and 6, rain switch assembly 28 comprises planimetric rain switch S40 mounted at an angle within stack 170. Attached to the inside of the upper flange of stack 170, in the example shown, is a hemispherically shaped wire screen with a peripheral flange. Planimetric switch S40 is circular in perimetric shape and is disposed in stack 170. The edge of switch S40 may be removed to enable rain water, entering through screen 171, to run off switch base 164 and exit from stack 170 by flowing between top cover 62 exterior, surface and stack 170 lower flange. Hermetically sealed cable 69 enters top cover 62 through hermetic seal 101 and is radially attached to the interior surface of top cover 62 and extends via continuous loop coil 70, through hermetic seal 99, located in surface of control panel 63, into main casing 60. The purpose of loop coil 70 is to provide an effective flexible joint or hinge for cable 69 to prevent conductors L100, L122, and L126 from breaking, as top cover 62 is opened and closed with respect to main casing 12, by means of hinge 45. FIG. 10 shows how this is accomplished. When top cover 62 is closed, as shown in FIG. 6, coil 70 compresses into several contiguous loops. This is the normal state of the cable and it is achieved by molding cable 69 to include loop configuration 70. When top cover 62 is opened, by means of hinge 45, as shown in FIG. 10, individual cable loops in coil 70 are expanded. When top cover 62 is closed loop coil 70 returns to its initial configuration as shown in FIG. 6. In this manner cable conductors span hinge 45, and as hinge 45 is manipulated, cable 69 contained conductors L100, L122, and L126 are not broken.

As show in FIG. 2, the timer control may be overridden if low operating voltage is applied to relay actuator R50, when rain switch S40 is conductive, via L102, L126, L120, 168, 110, 166, L118, L122 to R50, and thereto, from L104 via L124. During rainfall, S40 is conductive, due to the presence of conductive moisture on spaced apart electrodes 110. This causes the electromagnetic actuator coil of R50 to be energized; thereby, causing contact R50C1 to open and R50C2 to close.

When contact R50C1 opens, if mode switch S98 is in automatic position and clock timer switch contact S90 are closed, valve actuator H54 will be de-energized and valve 44 will close thereby terminating sprinkling. When R50C1 opens contact R50C2 closes and connects source of low operating voltage, present on conductor L102, to remote rain alarm 16, via conductor L108 in cable 165; and, connects conductor L104 via relay contact R50C2 to conductor L107.

Thus, when timer 89 switch contact S90 closes and mode switch S98 is in "automatic" position, valve 44 will open and close as clock timer switch contact S90 opens and closes if contact R50C1 is closed. If clock timer switch contact S90 is closed, valve 44 will open and sprinkling will occur unless rainfall occurs when relay R50 will be energized; thereby, opening contact R50C1 and causing sprinkling to terminate.

It is clear that valve 44 will remain closed until rain switch S40 and/or timer switch contact S90 are opened. Should rainfall cease before the preselected timer 89 cycle expires, relay R50 will be de-energized, contact R50C1 will close, valve actuator H54 will be energized, valve 44 will open, and lawn sprinkling will again occur. At the end of present timer 89 cycle, switch contact S90 opens, valve actuator H54 is de-energized, valve 44 closes, and lawn sprinkling is terminated.

During light rainfall or during the initial and/or terminal periods of rainfall, the operation of rain switch contact S40 may be somewhat erratic, due to a state of intermittant conductivity between spaced apart electrodes 110. This may cause relay R50 to be energized in a somewhat erratic manner; thereby, causing contacts R50C1 and R50C2 to be somewhat erratic. In like manner, the operation of valve 44 and rain alarm 16 may also be somewhat erratic. Finally, lawn sprinklers 11 may be somewhat intermittantly operative as a result. To prevent this difficulty relay R50 is selected to be a conventional time delay type.

Electronic, thermal, and solid state comprise the many different types of time delay relays that are commercially available with time delays ranging from a few tenths of a second to several minutes. In addition, these delay relays can provide both delay-on-operate and/or delay-on-release operation. Finally, such relays may have a fixed delay or be adapted for manually adjustable delay. The sprinkler controls described herein may be adapted to any of the described time delay relays. A few seconds delay is provided in the relay R50 between the energization of R50 and the opening of contact R50C1. In this manner, at the first impact of moisture on rain switch S40 a delay period begins and, at the end thereof, relay contact R50C1 opens and R50C2 closes. This results in relay R50 operations that are decisive in nature. It follows that sprinkler 11 and rain alarm 16 operations are equally pronounced. As a result valve, rail alarm and sprinkling "flutter" are avoided.

Figure 12:
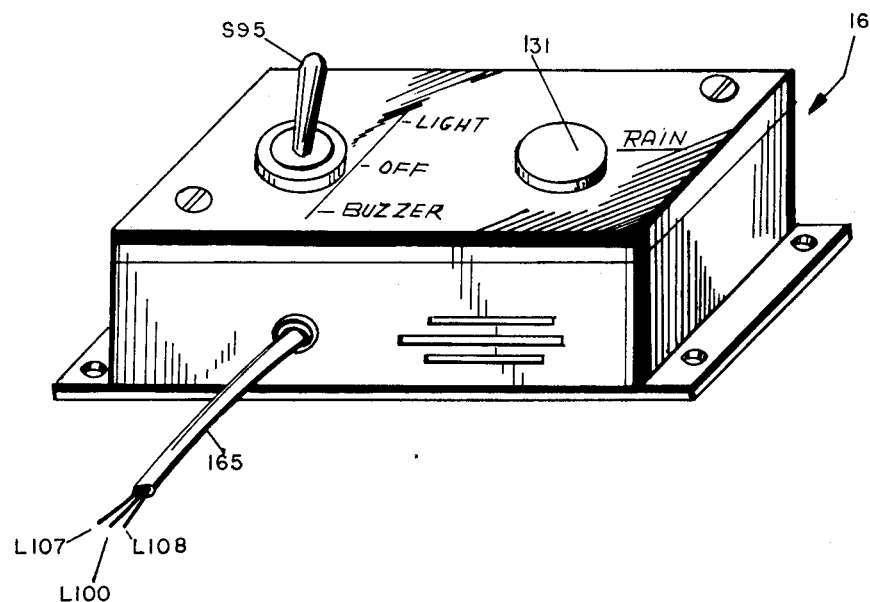
FIG. 12 is a pictorial view of the remote auxiliary sensor control, or rain alarm unit in accord with the principals of the present invention.
Figure 13:
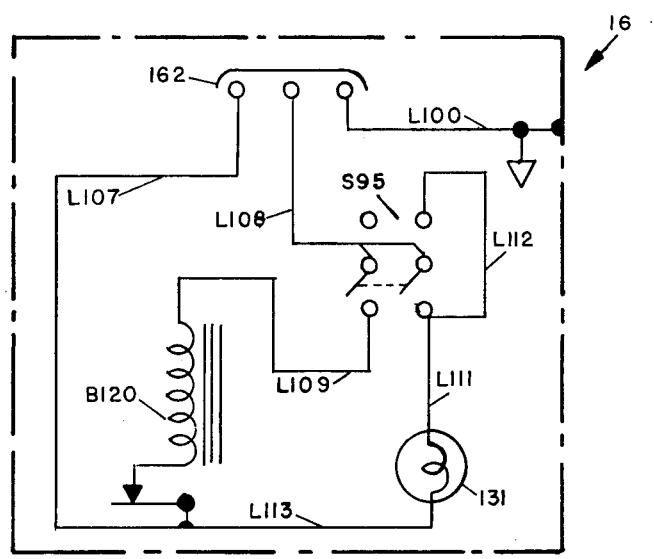
FIG. 13 is a schematic diagram of the remote rain alarm unit of FIG. 12.

In remote rain alarm 16, shown in FIGS. 2, 12 and 13, L107 is connected to audible buzzer B120 and to indicator light 131 via conductor L113. Conductor L108 is connected to both poles of three contact, double pole, switch S95. Buzzer B120 and indicator 131, opposite terminals; are connected to one pair of switch contacts, by conductors L109 and L111 respectively, and conductor L112 connects one contact of a third pair of switch contacts to indicator light opposite terminal. S95 second position switch contacts (not shown) are not connected. Thus, when switch S95 is in first or buzzer position, a source of low operating voltage is connected to buzzer B120 by relay contact R50C2 and conductors L104, L107; and, via L109, S95, L108 and L102. Indicator light 131 is also connected in parallel with B120 by conductors L113, L111, switch S95 and L109. In this position both buzzer B120 and light 131 will signal an alarm during rain fall. If S95 is in third or "light" position, buzzer B120 is disconnected from conductor L108 by switch S95; but, light 131 remains connected to L108 by conductor L112 and S95. Accordingly, in "light" position S95 provides a visual indication, but no audible alarm, that rain is falling. In a second or "off" position, S95 poles are disconnected and in that position both buzzer B120 and indicator light 131 are inoperative.

Figure 15:
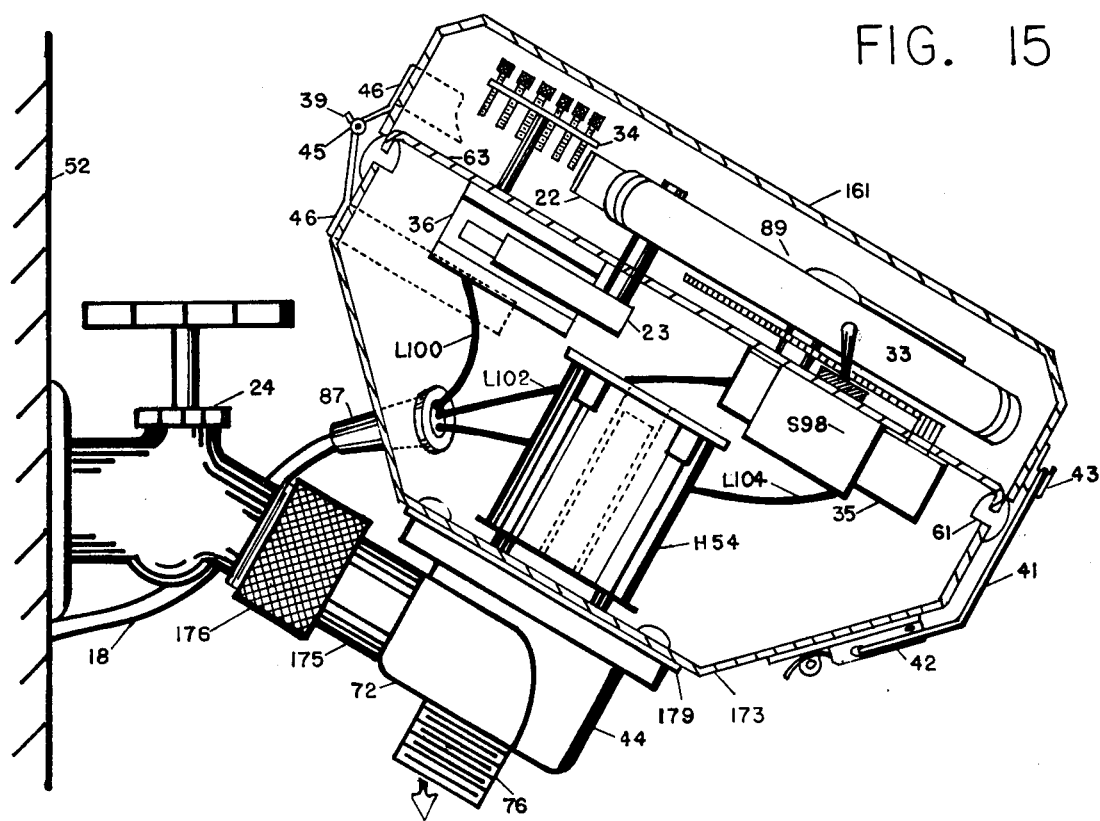
FIG. 15 is an elevation of a faucet supported sprinkler control in accord with the principals of the present invention, the casing of the unit being broken away to show its internal components.
Figure 16:
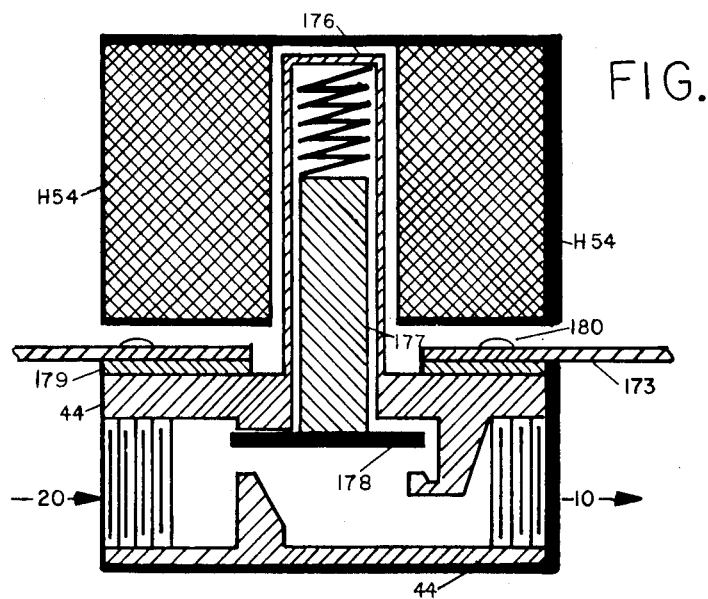
FIG. 16 is an elevation of the valve mounted to a heremetic sealed casing exterior with the valve actuator enclosed inside of the casing in accord with the principals of the present invention; and, FIG. 17 is a side elevation of the sprinkler or electrical timer control enclosed in a rectangular casing adapted for indoor installation in accord with the principals of the present invention.
Figure 17:
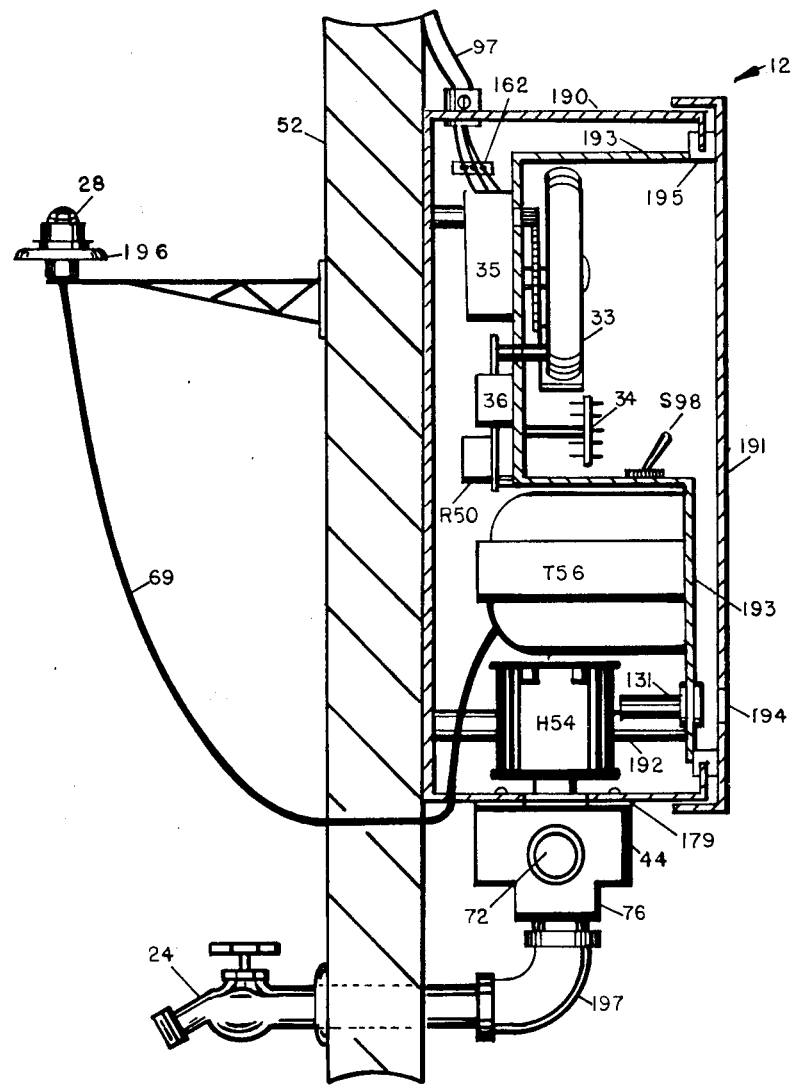

FIG. 5 shows a schematic diagram, previously described, of a faucet mounted and supported flow control. An elevation of this sprinkler control is shown in FIG. 15, where valve 44 housing is disposed exteriorly of main casing member 173 and valve conductor H54 is disposed inside of casing 173. This is accomplished by a novel valve design in conjunction with a unique arrangement of hermetic seals. FIG. 16 shows an elevation of this arrangement which is exemplified by its simplicity. Valve housing 44 is an enclosed unit attached and sealed to actuator tube 176 that is inserted into concentric electromagnetic valve actuator solenoid H54. A magnetic plunger 177 is connected to valve seal 178 such that when solenoid H54 is energized, core 177 is drawn up into tube 176, thereby, opening the valve and allowing fluid to flow therethrough from inlet conduit 20 to outlet conduit 10. Main valve housing 44 is attached to main casing 173 exterior with fasteners 180 and a hermetic seal is achieved by gasket 179. This unique arrangement permits the valve to be mounted as shown in the faucet mounted sprinkler control shown in FIG. 15 and, additionally, on the indoor mounted control which is shown in FIG. 17.

In FIG. 15, the main casing member 173 is of frusto-conical design to provide access directly to valve inlet 72 and outlet ports for attachment of conduit extension 175 to faucet outlet 24. Flexible conduit 10 and sprinkler 11 are attached directly to valve port 76. As shown, valve actuator H54 is located in the hermetically sealed interior of main casing 173. A control panel 63, with disposed thereon timer 89 and mode switch S98, all previously described, is attached to main casing 173 by, also previously described, gasket 61. A slightly modified cover lid 161 is hermetically sealed to annular gasket 61 by hinge 45 and draw pull catch 42 in the same manner herein already described. The faucet supported sprinkler control is energized with electric cable 18 and power plug 80 in the same manner as previously described. It is obvious that transformer T56 could be deleted and line voltage (available at plug pins 81) could be impressed upon conductors L102 and L104. Electrical load H54 would then be operated directly from line voltage source 78 (see FIG. 2). It is obvious that the control unit of FIG. 15 may be supported and secured upon the vertical stanchion shown in FIG. 14; and, control panel 63 (including the attached electrical timer components shown in FIG. 15, could be substituted in place of cover panel 91 in FIG. 9.

Figure 11:
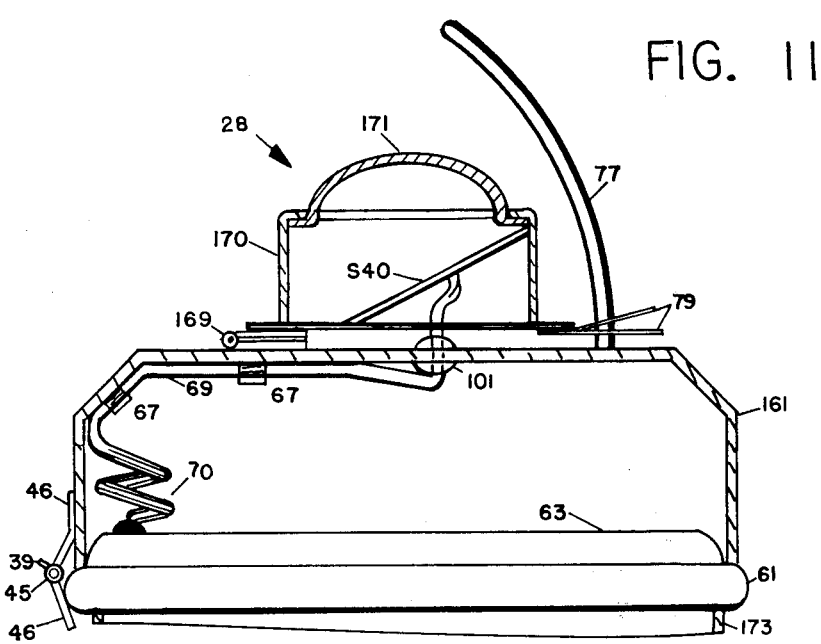
FIG. 11 is a partial cut-away elevation in accord with the principals of the present invention showing the auxiliary sensor or rain switch mounted on the top cover with means for adjusting its elevation angle.

Additionally, as shown in FIG. 2, the faucet supported sprinkler control may be adapted to be inoperative during rainfall by addition of rain switch S40, cable 69, conductors L122 and L126 and relay R50 with contact R50C1. In this arrangement, rain switch assembly 28 is mounted, as shown in FIG. 11. Stack 170, containing rain switch S40 and wire screen 171, is attached to the top cover 161 by hinge 169 and is rotatable therefrom. Attached to stack 170 lower flange are a pair of spring tabs 79 with holes, through which is inserted guide 77. When the tabs are pressed together rain switch assembly 28 is released from guide 77 and may be rotated about hinge 169, being diametrically guided by guide 77 in conjunction with tabs 79. When the correct angle of rain housing 28 is achieved, with respect to cover 161 top, spring tabs 79 are released; thereby, binding on guide 77 and causing rain switch assembly 28 to be held at that angular position. It is obvious that other means may be used to hold rain switch 28 at the desired angle. For example, guide 77 could be notched and a screw type or other clasp means could replace tabs 79. This arrangement enables rain switch S40 to be set at a correct angle for precipitation drainage for all possible faucet 24 angles.

Referring to FIGS. 2 and 3, the sprinkler control is arranged to provide safety from electrical shock hazzard. This has been achieved in a manner that is not only practical but economically feasible to manufacture. Beginning with ground pin 83 on dead-front connector 82, a ground conductor L100 is connected between the residential service inlet ground and power plug 80 casing, then through extension cable 18 to sprinkler control 12 casing; from which L100 ground wire is extended through cable 69 to rain switch housing 28, and through cable 165 to rain alarm 16 casing. In control unit 12, ground conductor L100 is also connected to control panel 63 and in cable 69, ground conductor L100 is connected to top cover 62 to insure a safety ground, in addition to, electrical conduction resulting via hinge 45. Finally, auxiliary control units such as outdoor valve 14 of FIGS. 1 and 14 are connected to grounded conductor L100 via cable 154. In this manner, it is virtually impossible for the consumer user to suffer electrical shock during operation of these sprinkler control units. Finally as shown in FIG. 3, a thin disc of soft neoprene material 75 is attached to the face of power plug 80 dead-front connector, with pins 81 and 83 extended therethrough, thereby, causing a hermetic seal between power plug dead-front electrified pins 81 and ground pin 83, and the electrified conventional receptacle outlet.

It is obvious to those skilled in such related art that the sprinkler flow controls described heretofore are unique in that the various different models, such as shown in FIG. 1, may be arranged into a novel do-it-yourself "family", whereby the average home owner may install a complete semi-portable aboveground sprinkler system. For example, FIG. 1 shows a sprinkler control 12 and an additional outdoor valve 14, in one such system; and additionally, sprinkler control 12 can be mechanized without rain switch 28, as already described. Also, outdoor valve 14 can be adapted with a rain switch assembly 28.

FIG. 17 is an elevation that shows the sprinkler control of FIG. 2 housed in a rectangular casing for indoor installation. In this arrangement, the unit may be permanently installed, or a power plug 80 and extension cable 18 may be used for simple "plug-in" operation. Also, valve 44 is mounted to the exterior of casing 190 in the same manner, as shown in FIG. 16. If permanent wiring is utilized, transformer T56 is included in the unit and disposed on panel 193 as shown. While the control may be arranged without rain override means, the inclusion thereof may be provided by means of rain switch assembly 28 disposed on platform 196. This assembly may be exteriorly mounted on a vertical stanchion or may be mounted on a horizontal hanger extended from the exterior surface of a building.

The indoor model, shown in FIG. 17, comprises a rectangular box 190, a control panel 193, a cover 191, a gasket 195, a valve 44 and plumbing means 197 to extend valve outlet port 76 to outdoor accessible valve 24; to which, is attached sprinkler 11. This apparatus may be mounted on an indoor wall 52. The indoor models utilize terminal connectors 162 such as are shown in FIG. 2, to connect thereto, auxiliary valve control 14 cable 154, rain alarm 16 cable 165, and operating line voltage cable 97. Additionally, rail alarm circuit 16 may as well be included and visual indicator 131 may be disposed behind hinged cover 191 hole 194 such that visual indication is displayed when cover door 191 is closed on main housing 190.

Additional indoor valves 138 may be remotely located in the same building and plumbed to additional outdoor faucets 13. As for example, the sprinkler control of FIG. 17 may be installed on a basement wall to provide water (valve 24) for front lawn sprinkling while an auxiliary indoor valve (indoor version of control 14, may be mounted on an opposite basement wall to provide water (valve 13) for the rear lawn sprinkling. In this example, the indoor version of auxiliary valve 14 is connected to the sprinkler control of FIG. 17 by permanently installed wiring utilizing terminal strips 162 for effecting wiring connections. Also, it is obvious that the outdoor valve 14 of FIGS. 1 and 14 may as well be connected to the indoor sprinkler control of FIG. 17. In this manner, it is possible to provide a completely flexible system of outdoor, indoor, or combination indoor-outdoor sprinkler controls for aboveground lawn sprinkler systems. It is equally obvious that such a system of controls could as well be utilized with an underground installed lawn sprinkling system.

It will be apparent to those skilled in the art to which it pertains that the invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning range of equivalents of the claims are therefore intended to be embraced therein.

What is claimed and desired to be secured by Letters Patent is:

1. An electrical timer switch control means comprising: timer means, a time switch, timer operating means, timer switch operating means, and time switch circuit means; an electrical load in a casing; said casing having a main quadric or frustoconical member the tapered peripheral extremity of which circumferentially abuts the peripheral extremity of a flat bottom cover thereby enclosing the bottom of said main frustoconical member, and the opposite peripheral extremity of said quadric or frustoconical member circumferentially abuts one peripheral extremity of a section of right circular cylinder and is contiguously attached thereto, a panel affixed to and closing said right circular cylindrical section at the opposite end thereof, said panel having a flat portion spanning said cylindrical member with a flange around the periphery of said panel flat portion, peripheral extremity of said panel flange in contiguous circumferential abutment with the peripheral extremity of said right circular cylinder; a continuous annular gasket inserted contiguously between said panel flange peripheral extremity and said main casing member peripheral extremity, said panel flange peripheral extremity is sandwiched circumferentially into the upper annular face of said gasket, and the opposite annular face of said gasket is telescoped over said main casing member peripheral extremity thereby providing a hermetical seal between the exterior surface of said panel and the interior of said main quadric casing member; a top cover comprising a quadric or frustoconical portion and a cylindrical portion the peripheral extremity of which is telescoped over the exterior surface of said panel peripheral flange and abuts circumferentially said upper annular face of said annular gasket thereby providing a hermetical seal between the exterior surface of said top cover and the exterior surface of said panel; said timer means and said timer operating means disposed on the exterior surface of said panel, being non-electrical; said timer means, said time switch, and said timer operating means disposed on the interior surface of said panel, being electrical; said timer operating means disposed on the interior surface of said panel motivating said timer means disposed on the exterior surface of said panel, by means of a single rotating drive shaft that protrudes through a hermetically sealed bushing extending from said panel interior surface to said panel exterior surface; said timer switch operating means disposed on said panel exterior surface actuating said timer switch operating means and said time switch, disposed on said panel interior surface by means of a single angularly oscillating drive shaft means protruding through a hermetically sealed bushing extending from said panel interior surface to said panel exterior surface; means accessible from the exterior of said casing for connecting an external power source to said timer operating means and for connecting said external power source in series with said electrical load and said time switch; and said timer operating means motivating said timer switch operating means causing said time switch to open and close in an automatically repetative cycle thereby energizing and de-energizing said load by means of said timer means.

2. The electrical timer switch control of claim 1 in combination with a hinge connecting said top cover to said main casing member wherein: leaves of said hinge span said annular gasket and the longitudinal pivot axis of said hinge is located with respect to said top cover and said annular gasket to minimize the distance between peripheral extremity of said top cover and said upper annular face of said gasket when said top cover is rotated to its maximum open position; means for attaching said hinge to the surface of said main casing member and to the surface of said top cover wherein said hinge leaves are arced along their lengths while said hinge axis is longitudinally straight and parallel to axis of said hinge leaves; and means to limit angular movement of said hinged top cover with respect to said main casing.

3. The combination of claim 2 wherein said hinge is spring loaded causing said top cover peripheral extremity to forcefully abut said upper annular face of said annular gasket providing a hermetical seal between said exterior surface of said top cover and the exterior surface of said panel.

4. The combination of claim 1 wherein clasp means are disposed on the exterior surface of said main casing; strike means for said clasp are disposed on the exterior surface of said top cover; clasp engaging means span said annular gasket and engage said strike; and when said clasp engaging means are actuated, said top cover hermetically seals to said upper annular face of said annular gasket.

5. The electrical timer switch control of claim 1 in combination with a three position mode control switch disposed on said panel; in one position, said mode control switch connects said time switch in series with said external power source and said time switch circuit means thereby causing the energization and de-energization of said load to be controlled by said timer means; in a second position, said mode control switch disconnects said power source from said time switch circuit means and from said load, and from said timer operating means, thereby, de-energizing said load and said timer operating means; in a third position, said mode control switch overrides said time switch and said timer means and connects said load by means of said time switch circuit means, directly to said external power source; and said mode control switch is disposed on the interior surface of said panel and is actuated by mechanical control means protruding through a hermetically sealed bushing extending from said panel interior surface to the exterior surface of said panel.

6. The electrical timer switch control of claim 1 wherein said timer control casing is attached to one extremity of a vertical stanchion by means of a cap; exterior flat surface of said cap centrally abutts, and is attached to, the exterior surface of said bottom cover; a center hole extends from said bottom cover interior surface to the interior flat surface of said cap; the interior wall surface of said cap is telescoped over the exterior surface of one extremity of said vertical stanchion, thereby, providing means for supporting said timer switch control; and conductor means from said external power source enter said timer control casing through said center hole, and through a slotted opening at one extremity of said stanchion, said opening abutting peripheral extremity of said cap.

7. The timer control of claim 6 wherein a diametric hole extends continuously through the telescoped together contiguous walls of said cap and said vertical stanchion extremity; extended through said diametric hole, is a section of solid rod having a circular flanged head at one extremity thereof, and a hole located diametrically through said rod at the opposite extremity thereof; and a pad lock shackle is passed through said diametric hole of said rod, thereby, locking said rod in place and preventing theft of said timer control.

8. The electrical timer switch control of claim 1 wherein said timer means comprise a timer providing multiple, contiguous, predeterminable, selectable, time control intervals within any given hourly time period, and wherein, any number of said selectable time control intervals may be selected in any given 24 hour time period, comprising: means for selecting said selectable time control intervals by means of moveable mechanical tabs disposed radially and perpendicular to the peripheral extremity of a time wheel; said timer operating means for causing said time wheel to repetitively complete one revolution in each said 24 hour time period; said tabs, and said timer switch operating means, causing an electrical contact of said electrical time switch to be actuated during said predetermined, selectable, time control intervals; and said time switch electrical contact is connected in series with said electrical power source and said electrical load, thereby, causing said timer means to energize and de-energize said load.

9. The electrical timer switch control of claim 8 wherein said selectable time control intervals, occuring during any combination of said 24 hour time periods, within a given continuous time period comprising 14 consecutive said 24 hour time periods, may be overridden by means, comprising: a 14 day time wheel driven by the said 24 hour time wheel such that said 14 day time wheel completes 1/14 of a revolution for each revolution completed by said 24 hour time wheel; said 14 day time wheel comprising 14 mechanically positionable tabs equally spaced circumferentially along the peripheral extremity of said 14 day time wheel; and said 14 day time wheel tabs selectively positionable to override said timer switch operating means and said electrical time switch contact and thereby prevent the actuation of said switch contact during any combination of said 24 hour time periods within said given continuous time period.

10. The electrical timer switch control of claim 1 wherein said load is located exterior of said casing interior.

11. The electrical timer control means of claim 1 wherein said conductor means extending from the exterior to the interior of said casing for connecting said power source to said timer operating means and to said time switch circuit means comprise a single electrical conductor means.

12. The electrical timer control means of claim 11 comprising: said single conductor means terminated in an electrical plug or connector at each extremity thereof; said single electrical conductor means extending from the exterior to the interior of said casing terminated in an electrical connector disposed in the exterior surface of said casing; and said single conductor plugs are plugged into said power source and into said electrical connector, thereby, causing said power source to energize said electrical timer control.

13. The electrical timer control means of claim 1 in combination with a relay in said casing for overriding said time switch comprising: a single pole double contact switch motivated by an electrical actuator means; when said actuator is de-energized, a first contact of said switch is closed and a second contact of said switch is open; when said actuator is energized said first contact is opened and said second contact is closed; said first contact connected in series with said power source, said time switch, and said load; said actuator connected in series with a suitable power source and an auxiliary sensor switching means; when said sensor switching means are activated, said actuator is energized, said first contact is opened, said second contact is closed, said series circuit of said load is interrupted, thereby overriding said time switch; and when said sensor switching means are deactivated, said actuator is de-energized, said first contact is closed, said second contact is opened, and said load energization and de-energization is restored to said time switch.

14. The electrical timer control means of claim 13 wherein said relay is a time delay relay comprising: time delay means wherein said first contact opens and said second contact closes at the end of a predetermined time interval or delay after said actuator is energized, thereby, providing said predetermined time interval or delay between the activation of said sensor switch means and overriding of said time switch; and when said sensor switching means are deactivated said first contact closes, said second contact opens, and control of said load is returned to said time switch substantially conterminously with said sensor switch deactivation.

15. The electrical timer control means of claim 14 wherein the length of said predetermined time interval is adjustable.

16. The electrical timer control means of claim 13 wherein said relay is a time delay relay comprising: timer delay means wherein said first contact opens and said second contact closes at the end of a first predetermined time interval or delay after said actuator is energized, thereby, providing said first predetermined time interval or delay between activation of said sensor switching means and overriding of said time switch; and, time delay means wherein said first contact closes and said second contact opens at the end of a second predetermined time interval or delay after said actuator is de-energized, thereby, providing said second predetermined time interval or delay between deactivation of said sensor switching means and restoration of energization and de-energization of said load to said time switch.

17. The electrical timer control means of claim 16 wherein the length of said first and said second predetermined time intervals, or delays, are adjustable.

18. The electrical timer control means of claim 13 wherein said relay contains only said first contact of said switch.

19. The electrical timer control means of claim 13 wherein the said sensor switching means are located in said casing interior; said switch is activated exterior of said casing by means of switch activation coupling means extending from the exterior to the interior of said casing; the juncture of said coupling means and said casing is hermetically sealed; and, activation of said sensor switching means may occur without requiring access to said casing interior.

20. The electrical timer control means of claim 19 wherein the said sensor switching means are located exterior of said casing interior.

21. The electrical timer control means of claim 13 in combination with a signal alarm means comprising: said alarm connected in series with a suitable power source and said second contact; when said actuator is energized said first contact is opened and said second contact is closed thereby activating said alarm; when said actuator is de-energized said second contact is opened thereby deactivating said alarm; said alarm signals when said sensor switching means are activated; and said alarm provides no signal when said sensor switching means are not activated.

22. The electrical timer control means of claim 21 wherein the said signal alarm means are located external of said casing.

23. The electrical timer means of claim 21 in combination with a voltage reducing means in said casing for providing said suitable power source of low operating voltage for use in series with said actuator and said sensor switching means; and, for use in series with said second contact and said alarm means, whereby only low voltage is used to energize said sensor switching means and said alarm means.

24. The electrical timer control means of claim 1 in combination with said conductor means comprising: a hermetically sealed multiple-conductor cable extending remotely from said casing to said external power source; one extremity of said cable having a ground conductor connected to said casing, and additional conductors connected to said timer operating means, and to said time switch circuit means in said casing interior; the opposite extremity of said cable connected to said external power source by means of a hermetically sealed electrical plug casing; said plug casing provided with a hermetically sealed multiple-pin grounded plug that plugs into a conventional grounded electrical service outlet receptacle; a step-down transformer in the interior of said plug casing, primary conductors of said transformer connected to line pins of said multiple-pin grounded plug, and secondary conductors of said transformer connected to conductors in said multiple-conductor cable thereby providing a source of low operating voltage to said timer operating means and to said electrical load; and ground pin of said multiple-pin grounded plug connected to said plug casing and to said ground conductor in said multiple-conductor cable.

25. The combination of the electrical timer control of claim 24 wherein the said stepdown transformer is of energy limiting type.

26. The combination of the electrical timer control of claim 24 wherein the said stepdown transformer is of grounded-barrier type with said barrier electrically connected to said coil core frame, to said plugcasing, to said ground pin of said multiple-pin grounded plug, and to said ground conductor of said multiple-conductor extension cable.

27. The combination of claim 24 wherein said primary coil and said secondary coil, of said step-down transformer, are wound and supported on a coil core frame that is an integral continuation of said plug casing cavity wall interior surface; exterior surface of said plug casing is constructed of electrically insulated material; and said coil core frame is constructed of thermally conductive material which protrudes through said plug casing causing heat, generated by said step-down transformer, to be radiated away from said plug casing by means of radiating fins protruding from said casing exterior surface.

28. The electrical timer control means of claim 1 wherein said conductor means comprise: a hermetically sealed multiple-conductor cable extending remotely from said casing to said external power source; one extremity of said cable having a ground conductor electrically connected to said casing and additional conductors electrically connected to said timer operating means and through said time switch in said casing interior to said electrical load; the opposite extremity of said cable connected to said external power source by means of a hermetically sealed electrical plug casing; said plug casing provided with a conventional hermetically sealed multiple-pin grounded plug that plugs into a conventional grounded electrical service outlet receptacle; a Ground-Fault Circuit-Interrupter in the interior of said plug casing; input conductors of said Ground-Fault Circuit-Interrupter connected to the line pins of said multiple-pin grounded plug; and output conductors of said Ground-Fault Circuit-Interruptor connected to conductors in said multiple-conductor cable thereby disconnecting said time switch circuit means, said time switch, said timer operating means, and said load from said external power source when said conductor means between said Ground-Fault Circuit-Interruptor output conductors and said load are not properly balanced with respect to ground.

29. An electrical timer switch control means comprising: timer means, timer operating means, time switch, timer switch operating means, time switch circuit means, and an electrical load in a casing; said casing having a main casing member of right circular cylinderical configuration, a bottom cover fitted into and fixed to said main casing member at one end thereof, a panel affixed to and closing said casing member at the opposite end thereof, said bottom cover having a flat portion spanning said main casing member with the periphery of said bottom cover flat portion abutting the periphery of said main casing member, and said panel having a flat portion spanning said main casing member, with peripheral extremity of said panel in contiguous circumferential abutment with the peripheral extremity of said main casing member; a continuous annular gasket inserted contiguously between said panel peripheral extremity and said main casing member peripheral extremity, said panel peripheral extremity is fitted circumferentially to an annular face of said gasket, and a second annular face of said gasket is fitted to said main casing member peripheral extremity thereby providing a heremetical seal between the exterior surface of said panel and the interior of said main casing member; a top cover comprising a quadric portion and a cylindrical portion the peripheral extremity of which abuts circumferentially an upper annular face of said annular gasket thereby providing a heremetical seal between the exterior surface of said top cover and the exterior surface of said panel; said timer means and said timer switch operating means disposed on the exterior surface of said panel being non-electrical; said timer means, said time switch, and said timer operating means disposed on the interior surface of said panel, being electrical; said timer operating means, disposed on the interior surface of said panel motivating said timer means disposed on the exterior surface of said panel, by means of a single rotating drive shaft that protrudes through a hermetically sealed bushing extending from said panel interior surface to said panel exterior surface; said timer switch operating means disposed on said panel exterior surface actuating said timer switch operating means and said time switch, disposed on said panel interior surface, by means of a single angularly oscillating drive shaft means protruding through a hermetically sealed bushing extending from said panel interior surface to said panel exterior surface; said electrical load housed in said casing interior and energized by a power source located exterior of said casing; conductor means extending from the exterior to the interior of said casing for connecting said power source to said timer operating means; said time switch circuit means in said casing interior for connecting said time switch and said load in series with said power source; said timer means motivating said timer operating means causing said time switch to open and close in an automatically repetative cycle thereby energizing and de-energizing said load by means of said timer means; and means for coupling the output of said load from the interior to the exterior of said casing without requiring access to the interior of said casing.

30. The electrical timer switch control of claim 29 wherein said timer means comprise a timer providing multiple, contiguous, predeterminable, selectable, time control intervals within any given hourly time period, and wherein, any number of said selectable time control intervals may be selected in any given 24 hour time period, comprising: means for selecting said selectable time control intervals by means of moveable mechanical tabs disposed radially and perpendicular to the peripheral extremity of a time wheel; said timer operating means for causing said time wheel to repetitively complete one revolution in each said 24 hour time period; said tabs and timer switch operating means, causing an electrical contact of said electrical time switch to be actuated during said predetermined, selectable, time control intervals; and said time switch electrical contact is connected in series with said electrical power source and said electrical load, thereby, causing said timer means to energize and de-energize said load.

31. The electrical timer switch control of claim 30 wherein the said selectable time control intervals, occuring during any combination of said 24 hour time periods, within a given continuous time period comprising 14 consecutive said 24 hour time periods, may be overridden by means, comprising: a 14 day time wheel driven by the said 24 hour time wheel such that said 14 day time wheel completes 1/14 of a revolution for each revolution completed by the said 24 hour time wheel;

said 14 day time wheel comprising 14 mechanically positionable tabs equally spaced circumferentially along the peripheral extremity of the said 14 day time wheel; and said 14 day time wheel tabs selectively positionable to override said timer switch operating means and said electrical time switch contact and thereby prevent the actuation of said switch contact during any combination of said 24 hour time periods within said given continuous time period.

32. The electrical timer switch control of claim 29 in combination with a three position mode control switch disposed on said panel; in one position, said mode control switch connects said load to said time switch circuit means causing the energization and de-energization of said load to be controlled by said timer means; in a second position, said mode control switch disconnects said power source from said time switch circuit means, from said load, and from said timer operating means, thereby, de-energizing said load; in a third position, said mode control switch overrides said time switch and said timer switch control means and connects said load directly to said external power source; and said mode control switch is disposed on the interior surface of said panel and is actuated by mechanical control means protruding through a hermetically sealed bushing extending from said panel interior surface to the exterior surface of said panel.

33. The electrical timer switch control of claim 29 wherein said electrical load is an electrical transformer.

34. The electrical timer switch control of claim 29 wherein said output coupling means comprise electrical connector means in the exterior surface of said bottom cover.

35. The electrical timer switch control of claim 34 wherein said bottom cover comprises: a flat portion spanning said main casing member; periphery of said bottom cover abutting the interior cylindrical surface of said main casing member; and said bottom cover sufficiently recessed into main casing member to provide both hermetical protection to said electrical connector means and manual accessibility to said electrical connectors thereby enabling an additional load located exterior of said casing to be connected to said load.

36. The electrical timer control means of claim 29 wherein said conductor means extending from the exterior to the interior of said casing comprise a single electrical conductor means.

37. The electrical timer control means of claim 36 in combination with an extension cable comprising: said single conductor means terminated in an electrical plug or connector at each extremity thereof; said single electrical connector means, extending from the exterior to the interior of said casing, terminated in an electrical connector disposed in the exterior surface of said casing; and said conductor plugs are plugged into said power source and into said electrical connector thereby causing said power source to energize said timer control.

38. The combination of claim 29 wherein clasp means are disposed on the exterior surface of said main casing; strike means for said clasp are disposed on the exterior surface of said top cover; clasp engaging means span said annular gasket and engage said strike; and when said clasp engaging means are actuated, said top cover hermetically seals to said upper annular face of said annular gasket.

39. The electrical timer switch control of claim 29 in combination with a hinge connecting said top cover to said main casing member wherein: leaves of said hinge span said annular gasket and the longitudinal pivot axis of said hinge is located with respect to said top cover and said annular gasket to minimize the distance between peripheral extremity of said top cover and said upper annular face of said gasket when said top cover is rotated to its maximum open position; means for attaching said hinge to the surface of said main casing member and to the surface of said top cover wherein said hinge leaves are arced along their lengths while said hinge axis is longitudinally straight and parallel to axis of said hinge leaves; and means to limit angular movement of said hinged top cover with respect to said main casing.

40. The combination of claim 39 wherein said hinge is spring loaded causing said top cover peripheral extremity to forcefully abut said upper annular face of said annular gasket providing a hermetical seal between the exterior surface of said top cover and exterior surface of said panel.

41. The electrical timer switch control of claim 29 wherein said timer control casing is attached to one extremity of a vertical stanchion by means of a cap; exterior flat surface of said cap centrally abuts, and is attached to, the exterior of said bottom cover; a center hole extends from said bottom cover interior surface to the interior surface of said cap; wall interior surface of said cap is telescoped over exterior surface of one extremity of said vertical stanchion, thereby, providing means for supporting said timer switch control; and said external power source conductor means enter said timer control casing through said center hole, and through a slotted opening at one extremity of said stanchion, said opening abutting peripheral extremity of said cap.

42. The timer control of claim 41 wherein a diametric hole extends continuously through the telescoped together contiguous walls of said cap and said vertical stanchion extremity; extended through said diametric hole is a section of solid rod having a circular flanged head at one extremity thereof, and a hole located diametrically through said rod at the opposite extremity thereof; and a pad lock shackle passed through said diametric hole of the said rod, thereby, locking said rod in place and preventing theft of said timer control.

43. The electrical timer control means of claim 29 in combination with a relay in said casing for overriding said time switch comprising: a single pole double contact switch motivated by an electrical actuator means; when said actuator is de-energized, a first contact of said switch is closed and a second contact of said switch is open; when said actuator is energized said first contact is opened and said second contact is closed; said first contact connected in series with said power source, said time switch, and said load; said actuator connected in series with a suitable power source and an auxiliary sensor switching means; when said sensor switching means are activated, said actuator is energized, said first contact is opened, said second contact is closed, said series circuit of said load is interrupted, thereby overriding said time switch; and when said sensor switching means are deactivated, said actuator is de-energized, said first contact is closed, said second contact is opened, and said load energization and de-energization is restored to said time switch.

44. The electrical timer control means of claim 43 wherein said relay is a time delay relay comprising: time delay means wherein said first contact opens and said second contact closes at the end of a predetermined time interval or delay after said actuator is energized, thereby, providing said predetermined time interval or delay between the activation of said sensor switch means and overriding of said time switch; and, when said sensor switching means are deactivated said first contact closes, said second contact opens, and control of said load is restored to said time switch substantially conterminously with said sensor switch deactivation.

45. The electrical timer control means of claim 44 wherein the length of said predetermined time interval is adjustable.

46. The electrical timer control means of claim 43 wherein said relay is a time delay relay comprising: time delay means wherein said first contact opens and said second contact closes at the end of a first predetermined time interval or delay after said actuator is energized, thereby, providing said first predetermined time interval or delay between activation of said sensor switching means and overriding of said time switch; and, time delay means wherein said first contact closes and said second contact opens at the end of a second predetermined time interval or delay after said actuator is de-energized, thereby, providing said second predetermined time interval or delay between deactivation of said sensor switching means and restoration of energization and de-energization of said load to said time switch.

47. The electrical timer control means of claim 46 wherein the length of said first and said second predetermined time intervals, or delays, are adjustable.

48. The electrical timer control means of claim 43 wherein said relay contains only said first contact.

49. The electrical timer control means of claim 43 wherein the said sensor switching means are located in said casing interior; said switch is activated exterior of said casing by means of switch activation coupling means extending from the exterior to the interior of said casing; the juncture of said coupling means and said casing is hermetically sealed; and, activation of said sensor switching means may occur without requiring access to said casing interior.

50. The electrical timer control means of claim 49 wherein the said sensor switching means are located exterior of said casing interior.

51. The electrical timer control means of claim 43 in combination with a signal alarm means comprising: said alarm connected in series with a suitable power source and said second contact; when said actuator is energized said first contact is opened and said second contact is closed thereby activating said alarm; when said actuator is de-energized said second contact is opened thereby deactivating said alarm; said alarm signals when said sensor switching means are activated; and said alarm provides no signal when said sensor switching means are not actuated.

52. The electrical timer control means of claim 51 wherein the said alarm is located external of said casing.

53. The electrical timer means of claim 51 in combination with a voltage reducing means in said casing for providing said suitable power source of low operating voltage for use in series with said actuator and said sensor switching means; and, for use in series with said second contact and said alarm means, whereby only low voltage is used to energize said sensor switching means and said alarm means.

54. The electrical timer control of claim 29 wherein said load is located exterior of said casing and said time switch circuit means extend from the interior to the exterior of said casing for connection to said exterior load thereby energizing and de-energizing said load by means of said timer means.

55. The electrical timer control of claim 54 wherein said connection means comprise electrical connector means in the exterior surface of said bottom cover.

56. The electrical timer control of claim 29 in combination with said conductor means comprising: a hermetically sealed multiple-conductor cable extending remotely from said casing to said external power source; one extremity of said cable having a ground conductor connected to said casing, and additional conductors connected to said timer operating means, and in series with said time switch and said load in said casing interior; the opposite extremity of said cable connected to said external power source by means of a hermetically sealed electrical plug casing; said plug casing provided with a hermetically sealed multiple-pin grounded plug that plugs into a conventional grounded electrical service outlet receptacle; a step-down transformer in the interior of said plug casing, primary conductors of said transformer connected to line pins of said multiple-pin grounded plug, and secondary conductors of said transformer connected to conductors in said multiple-conductor cable thereby providing a source of low operating voltage to said multiple-conductor cable, in series with said time switch and said load, and to said timer operating means; and ground pin of said multiple-pin grounded plug connected to said plug casing and to said ground conductor in said multiple-conductor cable.

57. The combination of the electrical timer control of claim 56 wherein the said step-down transformer is of energy limiting type.

58. The combination of the electrical timer control of claim 56 wherein the said step-down transformer is of grounded-barrier type with said barrier electrically connected to said coil core frame, to said plug casing, to said ground pin of said multiple-pin grounded plug, and to said ground conductor of said multiple-conductor extension cable.

59. The combination of the electrical timer control of claim 56 wherein said primary coil and said secondary coil, of said step-down transformer, are wound and supported on a coil core frame that is an integral continuation of said plug casing cavity wall interior surface; exterior surface of said plug casing is constructed of electrically insulated material; and said coil core frame is constructed of thermally conductive material which protrudes through said plug casing causing heat, generated by said step-down transformer, to be radiated away from said plug casing by means of radiating fins protruding from said casing exterior surface.

60. The combination of the electrical timer control of claim 29 wherein said conductor means comprise: a hermetically sealed multiple-conductor cable extending remotely from said casing to said external power source; one extremity of said cable having a ground conductor electrically connected to said casing and additional conductors electrically connected to said timer operating means and through said time switch in said casing interior to said electrical load; the opposite extremity of said cable connected to said external power source by means of a hermetically sealed electrical plug casing; said plug casing provided with a conventional hermetically sealed multiple-pin grounded plug that plugs into a conventional grounded electrical service outlet receptable; a Ground-Fault Circuit-Interrupter in the interior of said plug casing; input conductors of said Ground-Fault Circuit-Interrupter connected to the line pins of said multiple-pin grounded plug; and output conductors of said Ground-Fault Circuit-Interruptor connected to conductors in said multiple-conductor cable thereby disconnecting said time switch circuit means, said time switch, said timer operating means, and said load from said external power source when said conductor means between said Ground-Fault Circuit-Interruptor output conductors and said load are not properly balanced with respect to ground.

61. An electrical timer switch control means comprising: a time switch, timer switch operating means, timer operating means, and time switch circuit means; a hermetically sealed casing; one face of said casing is a cover panel; said timer means and said timer switch operating means disposed on the exterior surface of said cover panel, being non-electrical; said timer means, said time switch, and said timer operating means disposed on the interior surface of said cover panel, being electrical; said timer operating means disposed on the interior surface of said cover panel motivating said timer means disposed on the exterior surface of said cover panel, by means of a single rotating drive shaft that protrudes through a hermetically sealed bushing extending from said cover panel interior surface to said cover panel exterior surface; said timer switch operating means disposed on said panel exterior surface actuating said timer switch operating means and said time switch, disposed on said panel interior surface by means of a single angularly oscillating drive shaft means protruding through a hermetically sealed bushing extending from said cover panel interior surface to said panel exterior surface; means accessible from the exterior of said casing for connecting said timer operating means, and said time switch, to an external power source; and means accessible from exterior of said casing for connecting said power source and said time switch in series with an electrical load thereby energizing and de-energizing said load by means of said timer switch control means.

62. The electrical timer switch control of claim 61 wherein said timer means comprise a timer providing multiple, contiguous, predeterminable, selectable, time control intervals within any given hourly time period, and wherein, any number of said selectable time control intervals may be selected in any given 24 hour time period, comprising: means for selecting said selectable time control intervals by means of moveable mechanical tabs disposed radially and perpendicular to the peripherial extremity of a time wheel; said timer operating means for causing said time wheel to repetitively complete one revolution in each said 24 hour time period; said tabs, and said timer switch operating means, causing an electrical contact of said electrical time switch to be actuated during said predetermined, selectable, time control intervals; and said time switch electrical contact is connected in series with said electrical power source and said electrical load, thereby, causing said timer means to energize and de-energize said load.

63. The electrical timer switch control of claim 62 wherein said selectable time control intervals, occuring during any combination of said 24 hour time periods, within a given continuous time period comprising 14 consecutive said 24 hour time periods, may be overridden by means, comprising: a 14 day time wheel driven by the said 24 hour time wheel such that said 14 day time wheel completes 1/14 of a revolution for each revolution completed by said 24 hour time wheel; said 14 day time wheel comprising 14 mechanically positionable tabs equally spaced circumferentially along the peripheral extremity of said 14 day time wheel; and said 14 day time wheel tabs selectively positionable to override said timer switch operating means and said electrical time switch contact and thereby prevent the actuation of said switch contact during any combination of said 24 hour time periods within said given continuous time period.

* * * * *

UNITED STATES PATENT OFFICE
CERTIFICATE OF CORRECTION

Patent No. 4,061,893           Dated December 6, 1977

Inventor(s) George E. Sanner

It is certified that error appears in the above-identified patent and that said Letters Patent are hereby corrected as shown below:

```
Column  7, line 63, after "valve" add --, or load,--.
Column  7, line 65, after "valve" delete --or load--.
Column  8, line 26, after "provided" add -- ; --.
Column 10, line 41, after "timer" add --switch--.
Column 11, line 14, change "therein" to --thereon--.
Column 15, line 48, after "indicator" add --light--.
Column 15, line 54, change "buzzer" to --"buzzer"--.
Column 16, line 5, change "conductor" to --actuator--.
Column 16, line 15, change "176," to --176;--.
Column 16, line 26, after "outlet" add --76--.
Column 16, line 47, after "components" add --)--.
Column 17, line 28, change "therethrough," to --therethrough;--.
Column 18, line 10, change "14," to --14)--.
```

Signed and Sealed this

Twenty-second Day of August 1978

[SEAL]

Attest:

RUTH C. MASON
*Attesting Officer*

DONALD W. BANNER
*Commissioner of Patents and Trademarks*